United States Patent
Goradia

(10) Patent No.: US 11,068,587 B1
(45) Date of Patent: Jul. 20, 2021

(54) DYNAMIC GUEST IMAGE CREATION AND ROLLBACK

(71) Applicant: FireEye, Inc., Milpitas, CA (US)

(72) Inventor: Harnish Goradia, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 24 days.

(21) Appl. No.: 16/363,986

(22) Filed: Mar. 25, 2019

Related U.S. Application Data

(62) Division of application No. 14/222,524, filed on Mar. 21, 2014, now Pat. No. 10,242,185.

(51) Int. Cl.
*G06F 21/55* (2013.01)

(52) U.S. Cl.
CPC .................................. *G06F 21/552* (2013.01)

(58) Field of Classification Search
CPC ..................................................... G06F 21/552
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,526,485 A | 6/1996 | Brodsky | |
| 5,603,027 A | 2/1997 | Ohkami | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,118,382 A | 9/2000 | Hibbs et al. | |

(Continued)

FOREIGN PATENT DOCUMENTS

| | | |
|---|---|---|
| CN | 102811213 A | 12/2012 |
| GB | 2439806 A | 1/2008 |

(Continued)

OTHER PUBLICATIONS

Kim, H., et al., "Autograph: Toward Automated, Distributed Worm Signature Detection", Proceedings of the 13th Usenix Security Symposium (Security 2004), San Diego, (Aug. 2004), pp. 271-286.

(Continued)

*Primary Examiner* — Techane Gergiso
(74) *Attorney, Agent, or Firm* — Rutan & Tucker, LLP

(57) ABSTRACT

According to one embodiment, a computerized method comprises three operations. First, an exploit is determined to have been activated on a client device to transition a state of the client device from a non-infected state to an infected state. Second, a software image is determined prior to the client device receiving the object including the exploit. Lastly, an operating state of the client device is restored by at least reinstalling the software image on the client device so that the client device reverts to an operating state of the client device prior to activation of the exploit.

35 Claims, 14 Drawing Sheets

(56) References Cited

U.S. PATENT DOCUMENTS

| | | |
|---|---|---|
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,694,150 B1 | 4/2010 | Kirby |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,653 B2 | 3/2011 | Brickell et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 * | 7/2012 | Fitzgerald ............... G06F 21/56 718/1 |
| 8,234,709 B2 | 7/2012 | Viljoen et al. |
| 8,239,944 B1 | 8/2012 | Nachenberg et al. |
| 8,260,750 B1 | 9/2012 | Gugick et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,296,848 B1 | 10/2012 | Griffin et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |

(56) References Cited

U.S. PATENT DOCUMENTS

| | | |
|---|---|---|
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,607,346 B1 | 12/2013 | Hedge et al. |
| 8,612,971 B1 | 12/2013 | Fitzgerald et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,910,156 B1 | 12/2014 | Kenchammana-Hosekote et al. |
| 8,935,779 B2 | 1/2015 | Manni et al. |
| 8,949,257 B2 | 2/2015 | Shiffer et al. |
| 8,954,718 B1 * | 2/2015 | Raj .................... G06F 9/45545 713/1 |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,021,584 B2 | 4/2015 | Zaitsev |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 9,135,038 B1 * | 9/2015 | Uchronski .......... G06F 9/45558 |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,203,862 B1 * | 12/2015 | Kashyap ............ G06F 11/1405 |
| 9,223,972 B1 | 12/2015 | Vincent et al. |
| 9,225,740 B1 | 12/2015 | Ismael et al. |
| 9,233,972 B2 | 1/2016 | Itov et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,354,906 B1 * | 5/2016 | Uchronski .......... G06F 9/45545 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |

(56) References Cited

U.S. PATENT DOCUMENTS

| | | |
|---|---|---|
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,860 B1 * | 3/2018 | Banga .................. G06F 9/5027 |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0051168 A1 | 3/2003 | King et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0168070 A1 | 8/2004 | Szor |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2004/0268319 A1 | 12/2004 | Tousignant |
| 2005/0005159 A1 | 1/2005 | Oliphant |
| 2005/0008153 A1 | 1/2005 | Barton et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0081053 A1 | 4/2005 | Aston et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0102297 A1 | 5/2005 | Lloyd et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0229254 A1 | 10/2005 | Singh et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0195905 A1 | 8/2006 | Fudge |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |

(56) References Cited

U.S. PATENT DOCUMENTS

| | | |
|---|---|---|
| 2007/0006225 A1 | 1/2007 | McAlister et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0050848 A1 | 3/2007 | Khalid |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0150948 A1 | 6/2007 | De Spiegeleer |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0171921 A1 | 7/2007 | Wookey et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0014974 A1 | 1/2008 | Zhao et al. |
| 2008/0018122 A1 | 1/2008 | Zierler et al. |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0127348 A1 | 5/2008 | Largman et al. |
| 2008/0133208 A1 | 6/2008 | Stringham |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field |
| 2009/0013408 A1 | 1/2009 | Schipka |
| 2009/0019535 A1* | 1/2009 | Mishra .................. G06Q 30/04 726/12 |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko |
| 2009/0064332 A1 | 3/2009 | Porras |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089621 A1 | 4/2009 | Zhang |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0164994 A1 | 6/2009 | Vasilevsky et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0070978 A1 | 3/2010 | Chawla et al. |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0122343 A1 | 5/2010 | Ghosh et al. |
| 2010/0132038 A1 | 5/2010 | Zaitsev |
| 2010/0153617 A1* | 6/2010 | Miroshnichenko ... G06F 3/0635 711/6 |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0055299 A1* | 3/2011 | Phillips ............... G06F 9/45533 707/827 |
| 2011/0055907 A1 | 3/2011 | Narasimhan et al. |
| 2011/0078794 A1 | 3/2011 | Manni et al. |
| 2011/0083176 A1 | 4/2011 | Martynenko et al. |
| 2011/0093426 A1 | 4/2011 | Hoglund |
| 2011/0093951 A1 | 4/2011 | Aziz |

(56) References Cited

U.S. PATENT DOCUMENTS

| | | | |
|---|---|---|---|
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0185355 A1* | 7/2011 | Chawla ............. G06F 9/5077 718/1 |
| 2011/0218966 A1 | 9/2011 | Barnes et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265083 A1* | 10/2011 | Davis ............... G06F 12/0866 718/1 |
| 2011/0265182 A1 | 10/2011 | Peinado et al. |
| 2011/0289582 A1 | 11/2011 | Kejriwal et al. |
| 2011/0296440 A1 | 12/2011 | Launch et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0005672 A1* | 1/2012 | Cervantes .......... G06F 9/5077 718/1 |
| 2012/0005673 A1* | 1/2012 | Cervantes ......... G06F 9/45558 718/1 |
| 2012/0023593 A1 | 1/2012 | Puder |
| 2012/0054869 A1 | 3/2012 | Yen et al. |
| 2012/0066466 A1* | 3/2012 | Choi ................. G06F 3/0608 711/162 |
| 2012/0066698 A1 | 3/2012 | Yanoo |
| 2012/0079596 A1 | 3/2012 | Thomas |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Kue et al. |
| 2012/0124426 A1 | 5/2012 | Maybee et al. |
| 2012/0166818 A1 | 6/2012 | Orsini et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0174227 A1 | 7/2012 | Mashevsky et al. |
| 2012/0198279 A1 | 8/2012 | Schroeder |
| 2012/0210423 A1 | 8/2012 | Friedrichs et al. |
| 2012/0216046 A1 | 8/2012 | McDougal et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260304 A1 | 10/2012 | Morris et al. |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031548 A1 | 1/2013 | Kurozumi |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086579 A1* | 4/2013 | Venkat ............. G06F 9/45558 718/1 |
| 2013/0086585 A1* | 4/2013 | Huang ............... G06F 9/5061 718/1 |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0111591 A1 | 5/2013 | Topan et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0212151 A1 | 8/2013 | Herbach et al. |
| 2013/0227691 A1 | 8/2013 | Aziz et al. |
| 2013/0238673 A1 | 9/2013 | Rokuhara |
| 2013/0246370 A1 | 9/2013 | Bartram et al. |
| 2013/0246596 A1 | 9/2013 | Fujiwara |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0122441 A1 | 5/2014 | Vervaet et al. |
| 2014/0130158 A1 | 5/2014 | Wang et al. |
| 2014/0137180 A1 | 5/2014 | Lukacs et al. |
| 2014/0165203 A1 | 6/2014 | Friedrichs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0195636 A1* | 7/2014 | Karve ............... G06F 11/2094 709/215 |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0047034 A1 | 2/2015 | Burnham et al. |
| 2015/0074362 A1* | 3/2015 | Mohl ................. G06F 3/0667 711/162 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0135262 A1 | 5/2015 | Porat et al. |
| 2015/0154042 A1* | 6/2015 | Katayama .......... G06F 9/45533 718/1 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael |
| 2016/0006756 A1 | 1/2016 | Ismael |
| 2016/0021142 A1 | 1/2016 | Gafni et al. |
| 2016/0044000 A1 | 2/2016 | Cunningham |

(56) References Cited

U.S. PATENT DOCUMENTS

| | | |
|---|---|---|
| 2016/0092673 A1 | 3/2016 | Lemay et al. |
| 2016/0127393 A1 | 5/2016 | Aziz et al. |
| 2016/0179655 A1 | 6/2016 | Vecera et al. |
| 2016/0180090 A1 | 6/2016 | Dalcher et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

King, Samuel T., et al., "Operating System Support for Virtual Machines", ("King") (2003).
Konrad Rieck et al: "Automatic Analysis of Malware Behavior using Machine Learning", Journal of Computer Security, Amsterdam, NL vol. 19, No. 4 Jan. 1, 2009 (Jan. 1, 2009), pp. 639-668, XP002699268, ISSN 0926-227X, DOI: 10.3233/JCS-2010-0410 URL:http://honeyblog.org/junkyard/paper/malheur-TR-2009.pdf.
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam' Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM vol. 3, (Mar. 30-Apr. 3, 2003), pp. 1901-1910.
Morales, Jose k, et al., ""Analyzing and exploiting network behaviors of malware."", Security and Privacy in 2,ommunication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT/US14/55958 filed Sep. 16, 2014 International Search Report and Written Opinion, dated May 1, 2015.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 13/801,557 Application and Drawings filed Mar. 13, 2013.
U.S. Appl. No. 13/801,557 filed Mar. 13, 2013 Final Office Action dated May 28, 2015.
U.S. Appl. No. 13/801,557 filed Mar. 13, 2013 Non-Final Office Action dated Feb. 5, 2016.
U.S. Appl. No. 13/801,557 filed Mar. 13, 2013 Non-Final Office Action dated Nov. 17, 2014.
U.S. Appl. No. 14/042,454 filed Sep. 30, 2013 Non-Final Office Action dated Jun. 22, 2015.
U.S. Appl. No. 14/042,454 filed Sep. 30, 2013 Notice of Allowance dated Dec. 21, 2015.
U.S. Appl. No. 14/222,524 filed Mar. 21, 2014 Advisory Action dated Jul. 25, 2017.
U.S. Appl. No. 14/222,524 filed Mar. 21, 2014 Advisory Action dated Jul. 27, 2016.
U.S. Appl. No. 14/222,524 filed Mar. 21, 2014 Final Office Action dated Apr. 7, 2017.
U.S. Appl. No. 14/222,524 filed Mar. 21, 2014 Final Office Action dated Jun. 22, 2018.
U.S. Appl. No. 14/222,524 filed Mar. 21, 2014 Final Office Action dated May 12, 2016.
U.S. Appl. No.14/222,524 filed Mar. 21, 2014 Non-Final Office Action dated Oct. 8, 2015.
U.S. Appl. No. 14/222,524 filed Mar. 21, 2014 Non-Final Office Action dated Sep. 7, 2017.
U.S. Appl. No. 14/222,524 filed Mar. 21, 2014 Non-Final Office Action dated Sep. 20, 2016.

(56) References Cited

OTHER PUBLICATIONS

U.S. Appl. No. 14/222,524 filed Mar. 21, 2014 Notice of Allowance dated Oct. 31, 2018.
U.S. Appl. No. 14/952,808 filed Nov. 25, 2015 Final Office Action dated Jun. 8, 2020.
U.S. Appl. No. 14/952,808 filed Nov. 25, 2015 Non-Final Office Action dated Nov. 15, 2017.
U.S. Appl. No. 14/952,808 filed Nov. 25, 2015 Non-Final Office Action dated Oct. 28, 2019.
U.S. Appl. No. 14/952,808 filed Nov. 25, 2015 Advisory Action dated Oct. 31, 2018.
U.S. Appl. No. 14/952,808 filed Nov. 25, 2015 Final Office Action dated Jun. 18, 2019.
"Measuring Similarity of Malware Behavior", Martin Apel, Christian Bockermann and Michael Meier, (University of Dortmund), the 5th LCN Workshop on Security in Communications Networks (SICK 2009) Zurich, Switzerland; Oct. 20-23, 2009.
"Mining Specification of Malicious Behavior"—Jha et al, UCSB, Sep. 2007 https://www.cs.ucsb.edu/.about.chris/research/doc/esec07.sub.—mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.iso?reload=true&amumber=990073, (Dec.7, 2013).
"White Paper Advanced Threat Protection 1-16 Solution", UUL:http://cdn2.hubspot.net/hub/237610/file-232929750-pdf/White_Papers/WP-_Seculert_Solution.pdf, dated Jul. 28, 2013.
Abdullah, et al., Visualizing Network Data for Intrusion Detection, 2005 IEEE Workshop on Information Assurance and Security, pp. 100-108,.
Adetoye, Adedayo, et al., "Network Intrusion Detection & Response System", ("Adetoye") (Sep. 2003).
Adobe Systems Incorporated, "PDF 32000-1:2008, Document management—Portable document format—Part1:PDF 1.7", First Edition, Jul. 1, 2008, 756 pages.
AltaVista Advanced Search Results. "attack vector identifier". Http://www.altavista.com/web/results? Itag=ody&pg=aq&aqmode=aqa=Event+Orch-estrator . . . , (Accessed on Sep. 15, 2009).
AltaVista Advanced Search Results. "Event Orchestrator". Http://www.altavista.com/web/results? Itag=ody&pg=aq&aqmode=aqa=Event+Orch-esrator. . . , (Accessed on Sep. 3, 2009).
Anonymous: "Locality-sensitive hashing—Wikipedia", dated Aug. 21, 2013, retrieved from the Internet: URL:https:// en.wikipedia.org/w/index.php?title=Localitysensitive_hashing&oldid=569623118 [retrieved on Sep. 17, 2018].
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen"). (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—an advanced network forensic framework", Digital investigation 5, Elsevier, (2008), pp. S112- S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: an Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
EP 147817411 filed Apr. 27, 2016 Office Action dated Aug. 29, 2017.
EP 14781743.1 filed Apr. 27, 2016 Office Action dated Sep. 21, 2018.
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symanteccom/connectiblogs/, pp. 1-4.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/ searchresult.jsp? SortField=Score&SortOrder=desc-&ResultC . . . , (Accessed on Aug. 28, 2009).

(56) References Cited

OTHER PUBLICATIONS

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Jiyong Jang et al. "BitShred" Computer and Communications Security, ACM, dated (p. 309-320) Oct. 17, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
U.S. Appl. No. 14/952,808 filed Nov. 25, 2015 Final Office Action dated Jun. 21, 2018.
U.S. Appl. No. 14/952,808 filed Nov. 25, 2015 Non-Final Office Action dated Dec. 13, 2018.
U.S. Appl. No. 15/076,322 filed Mar. 21, 2016 Notice of Allowance dated Oct. 23, 2017.
U.S. Appl. No. 15/912,456 filed Mar. 5, 2018 Non-Final Office Action dated Apr. 19, 2018.
U.S. Appl. No. 15/912,456 filed Mar. 5, 2018 Notice of Allowance dated Oct. 11, 2018.
U.S. Appl. No. 16/285,072 filed Feb. 25, 2019 Non-Final Office Action dated Jul. 25, 2019.
U.S. Appl. No. 16/285,072 filed Feb. 25, 2019 Notice of Allowance dated Jan. 15, 2020.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Using Fuzzy Pattern Recognition to Detect Unknown Malicious Executables Code; Boyun Zhang, L. Wang and Y. Jin (Eds.): FSKD 2005, LNAI 3613, pp. 629-634, 2005. Springer-Verlag Berlin Heidelberg 2005. cited by examiner.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).
Wahid et al., Characterising the Evolution in Scanning Activity of Suspicious Hosts, Oct. 2009, Third International conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

DYNAMIC GUEST IMAGE CREATION AND ROLLBACK

CROSS-REFERENCES TO RELATED APPLICATIONS

This application is a divisional of U.S. patent application Ser. No. 14/222,524, filed Mar. 21, 2014, now U.S. Pat. No. 10,242,185, issued Mar. 26, 2019, the entire contents of which are incorporated by reference herein.

1. FIELD

Embodiments of the disclosure relate to the field of data security. More specifically, one embodiment of the disclosure relates to a system, apparatus and method for increasing the accuracy in detecting exploits in flows through the use of dynamic guest images and substantially decreasing the amount of time for remediation of an infected electronic device.

2. GENERAL BACKGROUND

Over the last decade or so, malicious software has become a pervasive problem for Internet users as most computers include software vulnerabilities that are subject to attack. For instance, over the past few years, more and more vulnerabilities are being discovered in software that is loaded onto a networked computer or other electronic device. While some vulnerabilities may be addressed through software patches (e.g., to close operating system "OS" vulnerabilities), electronic devices will continue to be targeted by exploits in efforts to acquire sensitive information or adversely affect operations of various enterprises.

In general, an exploit is executable code or other information that attempts to take advantage of a vulnerability by adversely influencing or attacking normal operations of a targeted electronic device. As an illustrative example, a Portable Execution Format (PDF) file may be infected with an exploit that is activated upon execution (opening) of the PDF file and takes advantage of a vulnerability associated with particular version or versions of Acrobat® Reader or another PDF reader application. This type of malicious attack may be designed to control operations of the targeted electronic device, which may include secretive transmission of stored sensitive information.

Currently, security devices may be implemented with a conventional exploit detection scheme that includes virtual machines (VMs) configured to process incoming objects in which the resultant behaviors are monitored during such processing. These "behaviors" may include expected behaviors by the VMs as well as unexpected (anomalous) behaviors such as communication-based anomalies or execution-based anomalies that may alter the functionality of a computer.

More specifically, for this conventional exploit detection scheme, the VMs are configured with general software profiles that are pre-selected in order to widely test different OS and application types commonly used by computers. For instance, general software profiles may be selected to virtualize a particular and widely adopted operating environment for testing purposes. While general software profiles are normally selected to test popular software configurations, these profiles normally differ, and in some cases substantially differ, from the actual operating states of computers currently deployed on a network. Hence, the conventional exploit detection scheme may produce false negatives as many exploits are not captured due to the generalization of the software profiles.

Additionally, once a computer becomes "infected" (e.g., an exploit now resides within internal storage of the computer), conventional remediation techniques are unable to be conducted within minutes of infection. Rather, such remediation may take hours or even days to occur and may be labor intensive.

It is well known that conventional remediation techniques within an enterprise are arduous and time consuming. For example, the infected computer would need to be physically delivered to the information technology (IT) department for analysis or the infected computer would be placed into an non-operational state until an IT member is available to run diagnostics. Hence, conventional remediation techniques are slow and may adversely affect productivity of the employee having the infected computer.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
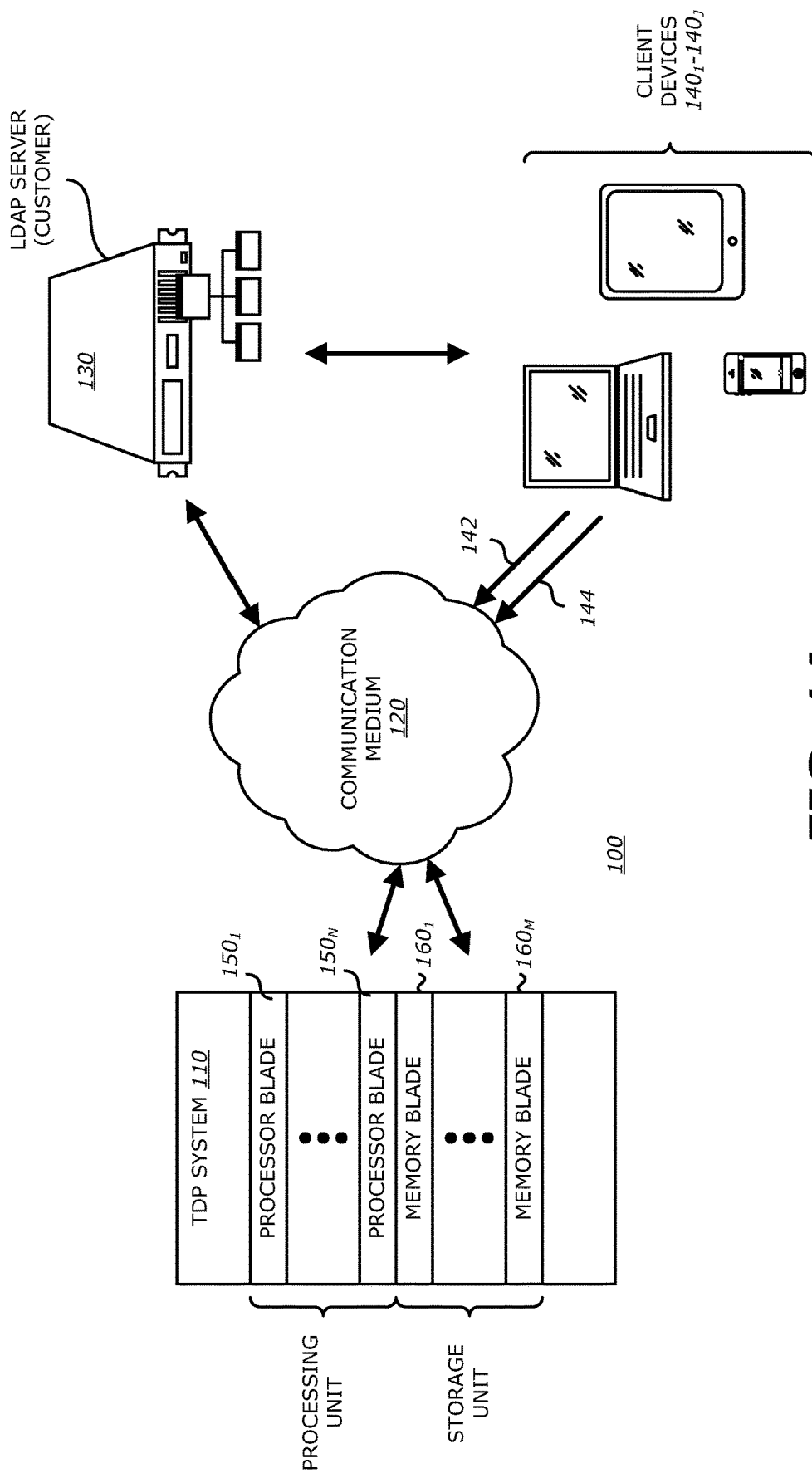
FIG. 1A is a block diagram of a first embodiment of an exemplary network adapted with a threat detection and prevention (TDP) system utilizing dynamic guest images for VM configuration.

Various embodiments of the disclosure relate to a threat detection and prevention (TDP) system, in the form of a security appliance or security cloud services (generally referred to as a "security system"), which analyzes objects associated with monitored network traffic using one or more virtual machines (VMs) each dynamically configured with a guest image representing the actual (and current) operating state of a targeted client (electronic) device. Through VM configuration using guest images, the TDP system is able to perform a concentrated dynamic analysis on network traffic from/to a particular client device as well as to conduct real-time remediation of the particular client device upon infection.

Herein, each "guest image" is an image of the content and structure of the storage volume for a specific client device at a particular point in time, namely a "snapshot" of the stored information including software along with metadata associated on the operating system (OS) and Open Systems Interconnect (OSI) Application layer data supporting the software (e.g., address location, size information, registry keys set by software, etc.). Hence, each guest image represents the current operating state of the client device at the time that the guest image is generated and is specific to only that client device. A timestamp may be applied to each guest image, where the time at least provides information as to the chronological order of its guest image to other guest images (e.g., time, monotonic count value, etc.).

Initially, one or more master images may be uploaded into the TDP system by an end user or administrator of the network. A "master image" represents a base amount of content (e.g., software and corresponding metadata) that is loaded into client devices for use by a member (user) of a particular group. The groups may be segregated according to any desired rubric. For instance, each group may correspond to one or more departments and/or sub-departments within an enterprise. Alternatively, each group may correspond to different regions, different languages, or in fact, may correspond to different enterprises where the TDP system supports an entire conglomerate.

More specifically, according to one embodiment of the disclosure, the master image may represent the initial "storage volume" of a client device supplied to a member of a particular group or groups within the enterprise, namely the initial content to be stored in persistent storage (e.g., hard disk, flash memory, etc.) of the client device. According to another embodiment of the disclosure, the master image may represent the requisite software, perhaps differing among the groups, which is loaded into the client device having connectivity to an enterprise network.

After uploading the master images to the TDP system and relating each master image to its assigned group or groups, each group member (or client device) may be related to at least one master image based on information within a Lightweight Directory Access Protocol (LDAP) server. Initial and subsequent access to the LDAP server may be accomplished by the TDP system through supplied LDAP credentials. Of course, after initial uploading of the master image(s), it is contemplated that each master image may undergo a one-way hash operation to produce a (master) hash value that may be used, at least initially, to confirm that the client device has been configured properly.

Besides relating one or more master images with each client device (or member of an enterprise), guest images may be generated and stored in response to changes in the storage volume of the client device. For instance, in response to a triggering event, the client device may initiate a native Volume Back-up program (e.g., Volume Shadow Copy for Windows® OS; Time Machine for iOS®, Google® Sync for Android® OS; iTunes® Sync for Mobile iOS®, etc.) to upload changes in the operating state of the client device to the TDP system. These changes in operating state may be uploaded through an "image update message," such as an Application Programming Interface "API" call for example, which is prompted by a triggering event at the client device. One example of a "triggering event" includes a predetermined amount of change in storage volume at the client device (e.g., a change of persistent storage of 1 kilobyte "Kb", 10 Kb, 100 Kb, etc.). Another triggering event may include installation and/or deletion of a software application at the client device. Yet another triggering event may include completion of a download of data (e.g., a Portable Document Format "PDF" file, text document, an image, or a video clip) attached to an electronic mail (email) message at the client device.

When triggered by a change in storage volume due to installation of new software, the image update message (e.g., API call) may comprise the newly installed software along with metadata changes on the OS and OSI Application Layer which support the newly installed software (e.g., address location, size changes, registry keys changes to support the software application, etc.). Where the image update message is triggered by removal of software, the metadata changes may include changes to denote removal of the software as well as changes to the OS and OSI Application Layer in response to removal of the software.

It is contemplated that one or more previous guest images along with information within the image update message may be used to create, in real time, a current guest image for the user's client device. For remediation, multiple guest images (e.g., up to ten guest images) may be retained for each client device. As a result, in response to detecting an object suspected of being exploit and the object being activated (e.g., opened, run, etc.) by the "infected" client device, the TDP system may generate an alert to identify that the client device has transitioned from a non-infected state to an infected state. After generating the alert, an administrator or someone with high-level credentials (e.g., super user) may restore the client device to a non-infected state in accordance with the remediation policy for the customer. For instance, the most recent guest image prior to infection may be restored on the client device. Furthermore, the administrator may view the operations of the suspect (or suspicious) exploit in detail and/or may be able to reload non-malicious information lost by restoration of the most recent guest image.

Besides dynamic guest image creation along with triggered or automatic remediation in response to the electronic device becoming infected, the TDP system is adapted to conduct VM-based processing using these guest images to enhance accuracy in exploit detection. Also, an interface (dashboard) is provided that allows an administrator to have a complete visualization from a system level perspective (e.g., number of master & guest images stored, number of remediated/infected electronic devices) and from a user perspective (e.g., number of infections on electronic device operated by a particular user, types of software infected, etc.).

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor; one or more processor cores; a programmable gate array; a microcontroller; an application specific integrated circuit; receiver, transmitter and/or transceiver circuitry; semiconductor memory; or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, such as a group of related packets, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript™ file, Zip™ file, a Flash file, a document (for example, a Microsoft Office® document), an email, a downloaded web page, an instant messaging element in accordance with Session Initiation Protocol (SIP) or another messaging protocol, or the like.

The term "flow" generally refers to a collection of related objects, communicated during a single communication session (e.g., Transport Control Protocol "TCP" session), perhaps between a source device and a destination device. A client device may be one of the source or destination devices.

A "message" generally refers to information transmitted as information in a prescribed format, where each message may be in the form of one or more packets or frames, an HTTP-based transmission, or any other series of bits having the prescribed format.

The term "transmission medium" is a physical or logical communication path with a client device, which is an electronic device with data processing and/or network connectivity such as, for example, a stationary or portable computer including a desktop computer, laptop, electronic reader, netbook or tablet; a smart phone; or wearable technology. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "verified" are used herein to represent that there is a prescribed level of confidence (or probability) on the presence of an exploit within an object under analysis. Also, an "exploit" may be construed as information (e.g., executable code, data, command(s), etc.) that attempts to take advantage of a software vulnerability, namely a coding error or artifact of software (e.g., computer program) that allows an attacker to alter legitimate control flow during processing of the software (computer program) by an electronic device, and thus, causes the electronic device to experience undesirable or unexpected behaviors.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architectures

Referring to FIG. 1A, a block diagram of a first embodiment of a client-based exploit detection scheme controlled by a threat detection and prevention (TDP) system utilizing dynamic guest images for VM configuration is shown. Herein, network 100 comprises a TDP system 110 that is configured to monitor network traffic propagating over a communication medium 120 being part of the network 100. The TDP system 110 is communicatively coupled to a Lightweight Directory Access Protocol (LDAP) server 130 and one or more client devices $140_1$-$140_J$ (J≥1).

As shown in FIG. 1A, TDP system 110 comprises one or more processor blades $150_1$-$150_N$ (N≥1) which may be organized in a vertical, centralized (rack) deployment as shown. The processor blades $150_1$-$150_N$ feature logic that is responsible for performing static and/or dynamic exploit analysis on objects extracted from network traffic propagating over the communication medium 120. For instance, as an illustrative embodiment, each processor blade $150_i$ (1≤i≤N) may operate as a stand-alone processing unit that is individually responsible for performing static and/or dynamic exploit analysis on objects extracted from network traffic associated with a particular set of client devices (e.g., client devices for a particular department, particular region, etc.). Alternatively, two or more (and perhaps all) processor blades $150_1$-$150_N$ may operate in a collective manner. For instance, a first processor blade $150_1$ may operate as a master processing unit while processor blade $150_2$ may operate as a slave processing unit or these processor blades $150_1$-$150_N$ may operate collectively in accordance with a selected load sharing scheme.

Additionally, the TDP system 110 includes one or more memory blades $160_1$-$160_M$ (M≥1). The memory blades $160_1$-$160_M$ comprise logic that is individually or collectively responsible for controlling TDP system configuration, which may include (1) uploading and/or storing master images, (2)

generating and/or storing guest images for each client device $140_1, \ldots,$ or $140_J$, and/or (3) generating a dashboard or other display screens for configuration and control of the TDP system. For instance, each memory blade $160_i$ ($1 \leq i \leq M$) may operate as a stand-alone storage unit that is individually responsible for maintaining master and guest images for particular group(s) of an enterprise (or different enterprises). Alternatively, two or more (and perhaps all) memory blades $160_1$-$160_M$ may operate in a collective manner. For instance, a first memory blade $160_1$ may operate to store master images while the other memory blades $160_2$-$160_M$ may operate to store guest images for different groups within the enterprise (or different guest images for different enterprises). Of course, the particular configurations for memory blades $160_1$-$160_M$ as well as processor blades $150_1$-$150_N$ may be adjusted according to customer needs.

At initial set-up, the LDAP credentials for accessing a customer's LDAP server may be obtained by (and optionally stored in) at least one of the memory blades $160_1$-$160_M$. The accessed LDAP credentials enable the memory blades $160_1$-$160_M$ to subsequently and automatically access content within the LDAP server 130 in order to identify group membership associated with each client device (user). The group membership signifies the particular master image assigned to the group member for configuration of his/her client device, where the master image provides an initial operating state (e.g., base software configuration). Thereafter, in response to storage volume changes made on the client device, one or more memory blades $160_1$-$160_M$ generate guest images for use in VM configuration. The guest images may be stored locally within the memory blades $160_1$-$160_M$ or externally, and the number of guest images stored per client device may be limited to a certain prescribed number set by an administrator.

More specifically, in response to a first storage volume change greater than a predetermined amount, the client device $140_1$ outputs an image update message 142 to the TDP system 110. The image update message 142 causes the TDP system 110 to generate a first guest image. The first guest image is based on a particular master image assigned to the group member having control of client device $140_1$ along with additional data that caused the storage volume change to occur. Similarly, a second guest image is based on the first guest image along with information contained within a subsequent image update message 144 produced by client devices $140_1$, where the information includes the additional data from the first storage volume change to the second storage volume change. This reiterative process continues until "X" guest images are stored for a particular user (e.g., X≥10 guest images). Once the image buffer is written with "X" guest images, any subsequent guest images may overwrite the older guest images in accordance with a first-in, first out (FIFO) storage scheme.

As an illustrative example, one or more master images may be uploaded by an administrator of the network 100 into the TDP system 110. These master images may be fetched from persistent storage accessible to the administrator (e.g., administrator's computer, dedicated server, disc, flash drive, etc.). For illustrative purposes, the master images correspond to base software configurations on a department and/or sub-department basis, where a master image for members of a first department (or sub-department) may differ from the master image for members of a second department (or sub-department). For security reasons, a master image may undergo static and dynamic analysis by one of the processor blades $150_1$-$150_N$ before that master image is uploaded to any of the memory blades $160_1$-$160_M$.

After uploading of the master images to one or more of the memory blades $160_1$-$160_4$ and relating the master images to the particular groups, the particular users (and their corresponding client devices) may be related to the groups through information stored within the LDAP server 130. More specifically, logic within the memory blades $160_1$-$160_4$ may be adapted to create one or more tables that provide correspondence between (1) client devices (identified by an identifier such as assigned computer name, MAC address, etc.); (2) assigned user for each client device; (3) group (e.g., department or sub-departments, etc.) to which the user belong; (4) addressing information associated with the master image corresponding to the group; and/or (5) addressing information for guest images associated with each particular user.

It is contemplated that multiple guest images may be generated and stored for each client device in response to changes in the storage volume of that client device. For example, in response to a predetermined amount of change in storage volume, the client device initiates a native Sync program (e.g., Volume Shadow Copy for Windows® OS; Time Machine for iOS®, Google® Sync for Android® OS; iTunes® Sync for Mobile iOS®, etc.) to commence transmission of an image upload message (e.g., messages 142, 144, etc.) that includes changes in the operating state of the client device (e.g., newly installed software application, metadata changes on the OS and OSI Application Layer that support the installed application, etc.). These operating state changes along with the image of a prior operating state (e.g., master image, preceding guest image, etc.) are used to generate a current guest image for the client device.

Prior to conducting VM-based exploit analysis on one or more objects extracted from network traffic from/to a particular client device $140_1, \ldots,$ or $140_J$ (e.g., client device $140_1$), one or more processor blades $150_1$-$150_N$ (e.g., processor blade $150_1$) are configured to access at least a current guest image for client device $140_1$ from memory blade $160_1$-$160_M$ (e.g., memory blade $160_M$), where the current guest image is used for configuring one or more virtual machines operating within processor blade $150_1$. Of course, it is contemplated that other guest images, such as older guest or images for client devices other than client device $140_1$ (e.g., client devices associated with users belonging to the same department), may be tested to confirm that any detected exploits are isolated to newly added content or content exclusively contained within that particular client device.

Figure 1B:
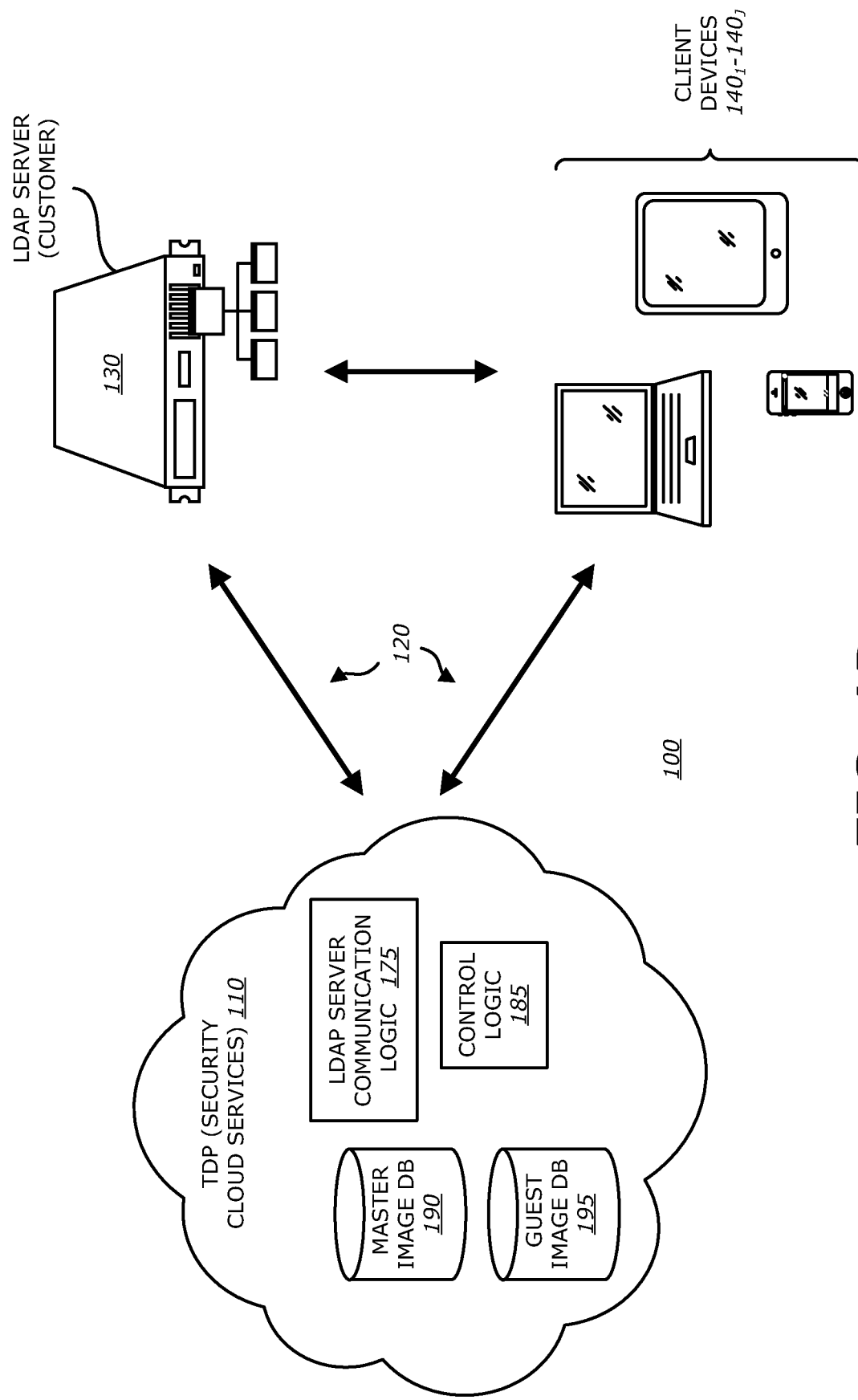
FIG. 1B is a block diagram of a second embodiment of an exemplary network adapted with a TDP system utilizing dynamic guest images for VM configuration.

Referring now to FIG. 1B, a block diagram of a second embodiment of a client-based exploit detection scheme controlled by the TDP system utilizing dynamic guest images for VM configuration is shown. Herein, deployed as part of a private network or part of a publicly accessible network, TDP system 110 operates as security cloud services configured to monitor network traffic propagating over the communication medium 120 that partially forms the network 100. Similar to the connectivity described in FIG. 1A, the TDP system 110 is communicatively coupled to LDAP server 130 and one or more client devices $140_1$-$140_J$.

As shown in FIG. 1B, the security cloud services forming TDP system 110 comprises one or more databases to maintain master images of an enterprise as well as multiple guest images for each client device $140_1$-$140_J$ and control logic to maintain these databases. At initial set-up, being part of the security cloud services, the LDAP server communication logic 175 may be configured to obtain LDAP credentials in order to gain access a customer's LDAP server 130. The information accessed from the LDAP server 130 may be used to map (i) identifiers of the client devices $140_1$-$140_J$ to particular users assigned to these client devices, and (ii) the particular users to corresponding groups (e.g., departments or sub-departments). From this information and prior identification as to which groups corresponding to which master images, control logic 185 within the security cloud services is able to determine which master image is the base image for which user. The master images may be stored in master image database 190.

Thereafter, in response to volume changes made on the client device $140_1$, control logic 185 generates guest images based originally from the master image associated with that client device $140_1$. For instance, a first guest image for client device $140_1$ may be based on (i) a particular master image assigned to the user of client device $140_1$ and (ii) the differential information associated with the storage volume change. As an example, the differential information may include a newly installed software application and metadata (OS and OSI Application layer) to support the software application. The guest images are stored in guest image database 195.

The generation of second and subsequent guest images may be performed in a reiterative manner until "X" guest images are stored for each particular user. Once the "X" guest images are stored, any subsequent guest images may overwrite the oldest guest image in accordance with a first-in, first out (FIFO) storage scheme for example.

Referring to both FIGS. 1A-1B, it is contemplated that a hash value may be generated and stored for each master image for subsequent confirmation that the base software configuration for a particular client device (controlled a particular user) is accurately assigned. This may be accomplished by conducting a hash operation on the initial configuration and comparing the resultant hash value to the hash value for the master image assigned to the client device. Additional hash values may be generated for each change in storage volume where a series of hash values may be used to confirm upload accuracy.

Figure 2A:
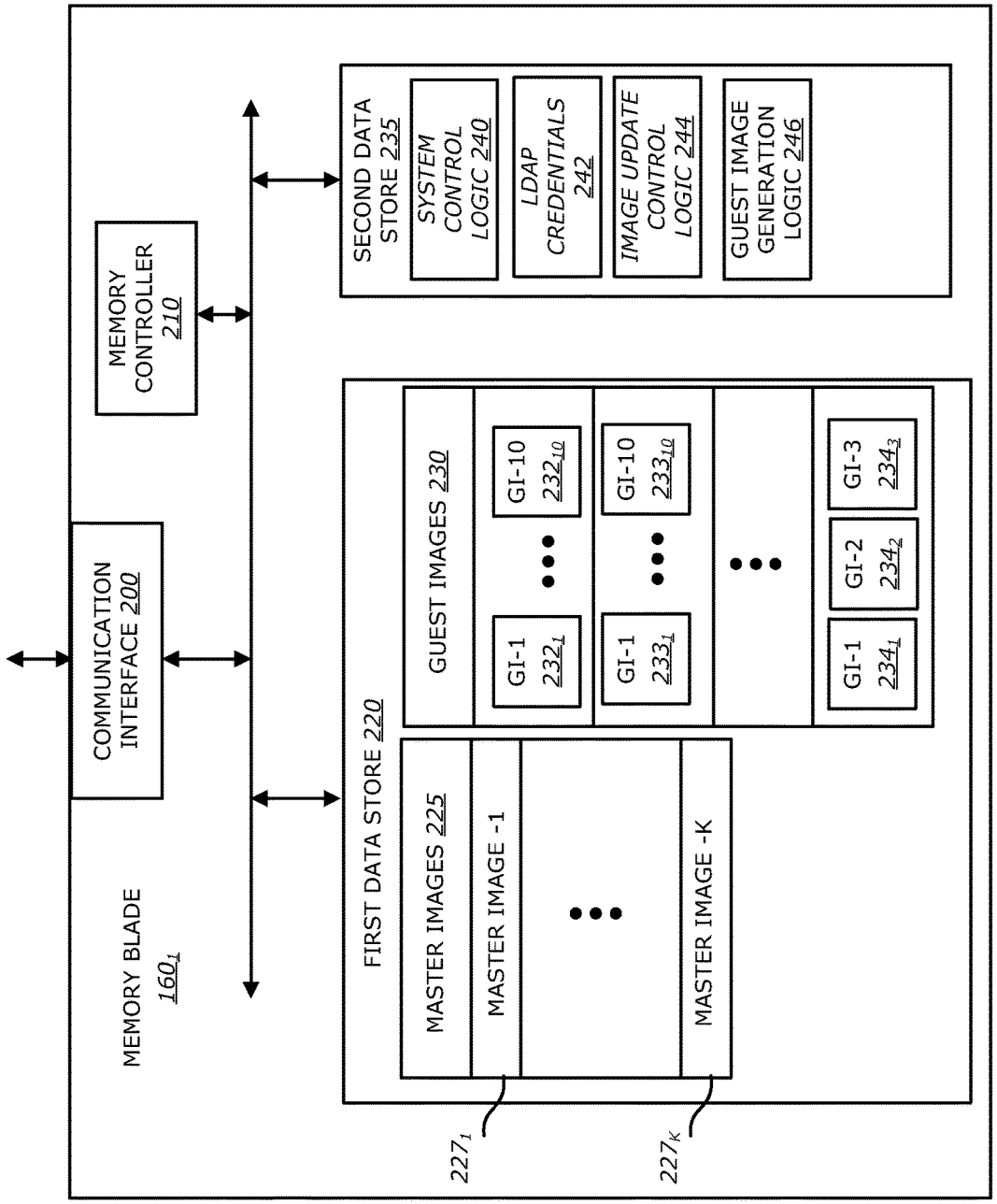
FIG. 2A is an exemplary embodiment of a logical representation of the memory blade being a component of the TDP system of FIG. 1A.

Referring to FIG. 2A, an exemplary embodiment of a logical representation of the memory blade $160_1$ of FIG. 1A is shown. Herein, the memory blade $160_1$ comprises a communication interface 200, a memory controller 210, a first data store 220 and a second data store 235. The communication interface 200 provides connectivity with resources within network 100, including LDAP server 130 and one or more client devices $140_1$-$140_J$ illustrated in FIG. 1A. Furthermore, the communication interface 200 provides connectivity with one or more processor blades $150_1$-$150_N$ and/or one or more of the remaining memory blades $160_2$-$160_M$ of FIG. 1A. Hence, the blade server implementation for the TDP system 110 provides scalability through increased software image storage capacity through increased memory blades and/or increased processing capability through increased processor blades.

Memory controller 210 is configured to control the initial configuration of the memory blade based on initial upload of one or more master images 225, relate the master image(s) to client devices adapted to access the network, and generate guest images 230 for changes in operating state at the client devices.

More specifically, in response to a login request by an administrator, the memory controller 210 executes system control logic 240 that produces one or more interactive display screens to enable the administrator to upload and relate master images $227_1$-$227_K$ to particular groups as well as download a dashboard to view system status and control remediation, as described below.

Where the administrator selects to upload one or more master images, the memory controller 210 controls storage of master images $227_1$-$227_K$ within the first data store 220. The memory controller 210 may further store addressing information of each master image $227_1$-$227_K$ within internal memory (not shown) or within one of the data stores 220 and 235.

After completing an upload of the master image(s), the memory controller 210 may control relating the master image(s) to one or more ("J") client devices based on information acquired from the LDAP server. In particular, the memory controller 210, under control by the system control logic 240, generates one or more interactive display screens into which LDAP credentials 242 for accessing a customer's LDAP server may be conveyed. The LDAP credentials 242 may be optionally cached (as shown) to enable the TDP system to automatically access the LDAP server in response to subsequent master image uploads or to periodically check if any users have moved departments (where the software configuration should be changed) or have left the enterprise (where guest images can be deleted or downloaded to external storage for retention). Contents within the LDAP server enable the master image to be related to particular client devices that should be loaded with the software configuration represented by the master image.

As further shown in FIG. 2A, the first data store 220 of memory blade $160_1$ may be configured to store guest images for each of the client devices $140_1$-$140_J$. For instance, as an illustrative example, a maximum of ten guest images $232_1$-$232_{10}$ are stored for a first client device $140_1$, ten guest images $233_1$-$233_{10}$ are stored for a second client device $140_2$, and three guest images $234_1$-$234_3$ are currently stored for an $L^{th}$ client device $140_L$.

In response to receiving a native Sync program signal and subsequent image update message, under control by the image update control logic 244, the memory controller 210 may locate the most recent guest image associated with the client device that initiated the image update message through timestamp review and extract update information associated with the storage volume changes from the update image message. The most recent guest image and the extracted update information are provided to the guest image generation logic 246. Processed by the memory controller 210, the guest image generation logic 246 creates a current guest image representing the current operating state of the client device based on the most recent guest image and the update information. The current guest image along with its timestamp may be stored in an address range reserved for guest images for the particular client device.

Figure 2B:
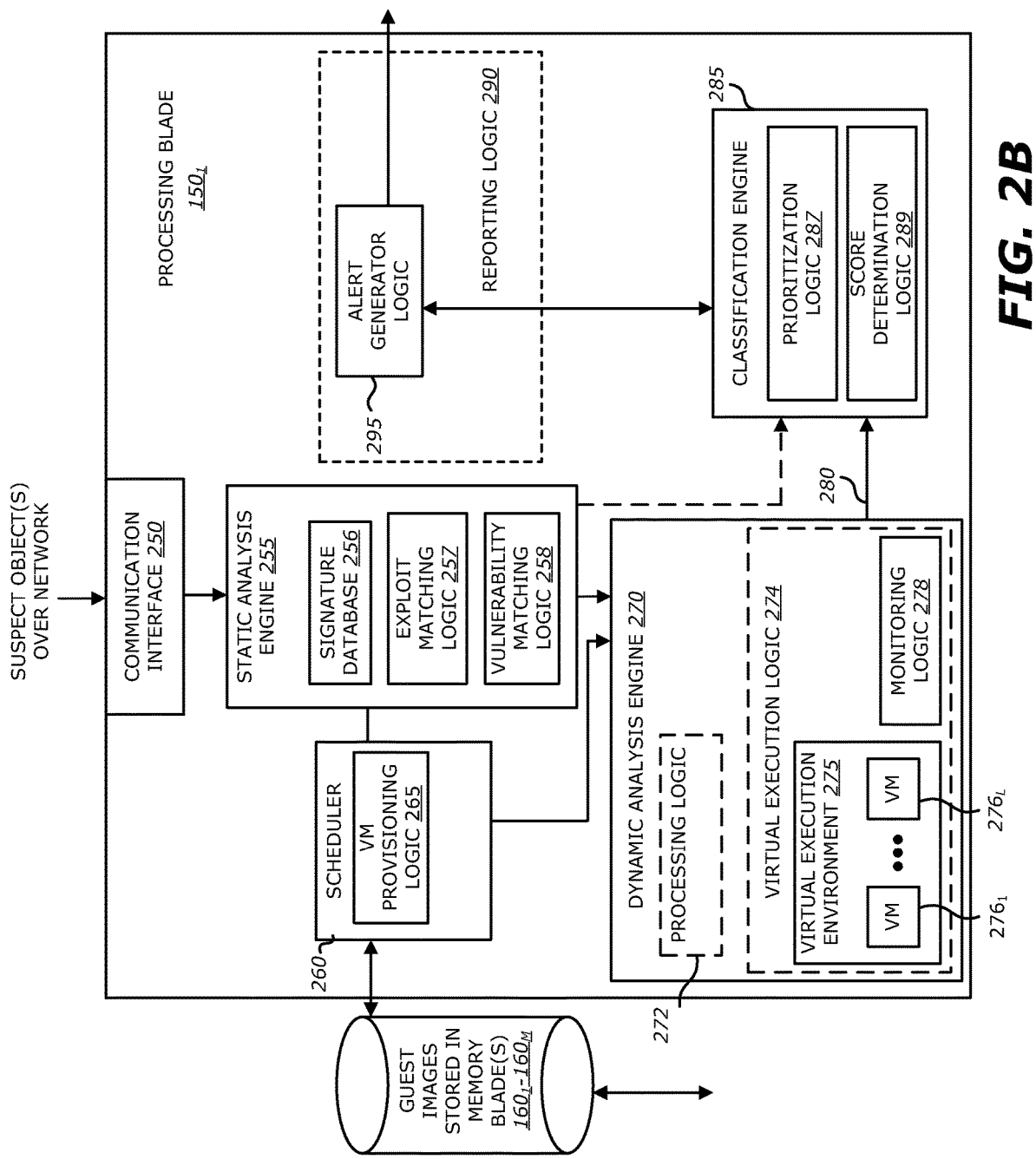
FIG. 2B is an exemplary embodiment of a logical representation of the processor blade being a component of the TDP system of FIG. 1A.

Referring now to FIG. 2B, an exemplary embodiment of a logical representation of the processor blade $150_1$ is shown. Herein, the processor blade $150_1$ comprises a communication interface 250, a static analysis engine 255, a schedule 260, a dynamic analysis engine 270, a classification engine 285 and reporting logic 290. The communication interface 250 provides connectivity with resources within network 100 of FIG. 1A, including one or more client devices to which alerts may be generated. Furthermore, communication interface 250 provides connectivity with (i) one or more memory blades $160_1$-$160_M$ from which guest images for configuring one of more virtual machines within the dynamic analysis engine 270 may be obtained and/or (ii) one or more of the remaining processor blades $150_2$-$150_N$.

Herein, according to this embodiment of the disclosure, processor blade $150_1$ is an electronic device deployed within the TDP system 110 (see FIG. 1A) that is adapted to (i) intercept network traffic that is routed over a communication network to/from a particular client device (not shown) and (ii) monitor, in real-time, content within the network traffic. Although not shown, the processor blade $150_1$ is communicatively coupled to a management system that may be configured to automatically update one or more exploit signatures and/or vulnerability signatures used by logic within static analysis engine 255. Stored in signature database 256, each of these signatures may represent a prior detected exploit or an uncovered software vulnerability. Such sharing may be conducted automatically or through manual uploads. Also, such sharing may be conducted freely by the TDP system 110 with other TDP systems or subject to a subscription basis.

Herein, according to the embodiment illustrated in FIG. 2B, the static analysis engine 255 may include one or more software modules that, when executed by one or more processors, performs static scanning on a particular object. Examples of different types of static scanning may include exploit signature checks and/or vulnerability signature checks. Signature check operations may involve accessing pre-stored signatures from one or more non-transitory storage mediums such as signature database 256.

In general, referring to FIG. 2B, the static analysis engine 255 is communicatively coupled to receive one or more objects from network traffic which may be related or unrelated to each other. For instance, one object may be a series of HTTP packets operating as a flow routed over the network. The static analysis engine 255 comprises exploit matching logic 257 that performs exploit signature checks, which may involve a comparison of one or more pre-stored exploit signatures (pre-configured and predetermined attack patterns against the suspect object) from signature database 256. Similarly, the signature matching logic 258 performs vulnerability signature checks, which may involve a process of uncovering deviations in messaging practices set forth in applicable communication protocols (e.g., HTTP, TCP, etc.). As an illustrative example, HTTP messages may be analyzed to determine compliance with certain message formats established for the protocol (e.g., out-of-order commands). Furthermore, payload parameters of the HTTP messages may be analyzed to determine further compliance.

Upon detecting a match during the exploit signature check and/or the vulnerability signature check (an object under analysis has characteristics that suggest the object is an exploit), the static analysis engine 255 determines that the object is "suspicious," namely has characteristics that suggest the object is an exploit, and routes the suspect object to the dynamic analysis engine 270 for more in-depth analysis. In one embodiments, the static analysis may alternatively or additionally include applying heuristics to identify suspicious characteristics of the object such as communication protocol anomalies for example in a flow.

The dynamic analysis engine 270 is configured to provide more in-depth analysis of suspect object(s) from the static analysis engine 255 by analyzing behaviors during processing of the suspect object(s) in order to verify whether or not the suspect object is an exploit.

More specifically, after static scanning has been completed, the static analysis logic 255 provides the suspect object to the dynamic analysis engine 270 for in-depth dynamic analysis using virtual machines (VMs) $276_1$-$276_R$ (R≥1). For instance, the dynamic analysis engine 270 may simulate transmission to and receipt by a destination device comprising the virtual machine. Of course, if the object is not suspected of being an exploit, the static analysis engine 255 may simply discard the results or store them with an external data source.

According to one embodiment, one or more VMs $276_1$-$276_R$ within the virtual execution environment 275 may be configured based on metadata extracted from the network traffic (e.g., address information to identify the client device operating as the source or destination of the network traffic). In particular, one or more guest images for the identified client device are selected by VM provisioning logic 265 within the scheduler 260 and provided to the VM execution environment 275, where VM $276_1$ may be configured with the most recent guest image of the client device. This provisioning of guest images for the identified client device provides a more accurate VM configuration for analyzing the suspect object than conventional means.

According to one embodiment of the disclosure, the dynamic analysis engine 270 is adapted to execute one or more VMs $276_1$-$276_R$ to simulate the receipt and execution of content associated with the suspect object within a run-time environment as expected for the suspect object. For instance, the dynamic analysis engine 270 may include processing logic 272 that "replays" the network communication in a virtual machine (e.g., VM $276_1$) in accordance with (e.g., in a sequence prescribed by) the applicable communication protocol by sending its data packets to VM $276_1$, and synchronizes any return network traffic generated from the VM $276_1$ in response to the network communication. The processing logic 272 may suppress (e.g., discard) the return network traffic such that it is not transmitted to any host or other real ("live") device but is nonetheless intercepted for analysis. The processing logic 272 may change destination IP addresses of data packets in the network communication to one or more IP addresses assigned to the VM $276_1$, or may alter a time scale to assist in detonation of time bomb exploits.

Herein, the static analysis engine 255 and the dynamic analysis engine 270 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

As further shown in FIG. 2B, the monitoring logic 278 within the dynamic analysis engine 270 may be configured to monitor behavior of the suspect object being analyzed by one or more VMs $276_1$, . . . , and/or $276_R$, for detecting anomalous or unexpected activity indicative of an exploit. If so, the suspect object may be determined as being associated with malicious activity, and thereafter, monitoring logic 278, perhaps operating with a score determination logic (not shown), may route the VM-based results 280 (e.g., computed score, information associated with the detected anomalous behaviors, and other information associated with the detected malicious activity by the suspect object) to classification engine 285.

According to one embodiment of the disclosure, the classification engine 285 comprises prioritization logic 287 and score determination logic 289. The prioritization logic 287 may be configured to apply weighting to the VM-based results 280 provided from dynamic analysis engine 270 and/or results from the static analysis engine 255 (represented by a dashed input). These results may include a score produced by score determination logic implemented within dynamic analysis engine 270 and/or static analysis engine 255, where the "score" is a value that classifies the threat level of the detected potential exploit.

Herein, the score determination logic 289 comprises one or more software modules that are used to determine a probability (or level of confidence) that the suspect object is an exploit. Based on the VM-based result 280 and/or results from the static analysis engine 255, score determination logic 289 may be configured to generate a value (referred to as an "overall score") that classifies the object or a series of objects as an exploit. It is contemplated that the score may be assigned to the suspect object as a whole by mathematically combining scores determined by analysis of different content associated with the same suspect object to obtain an overall score for that suspect object.

If the score determination logic 289 generates an overall score that represents the suspect object has been verified to be an exploit, information may be provided to alert/report generation logic 295 within the reporting logic 290 to notify a network administrator of the exploit detected and such information may be stored within one of the memory blades $160_1$-$160_M$ for extraction and display within a dashboard as described below.

III. Exemplary Dynamic Guest Image Creation

Figure 3:
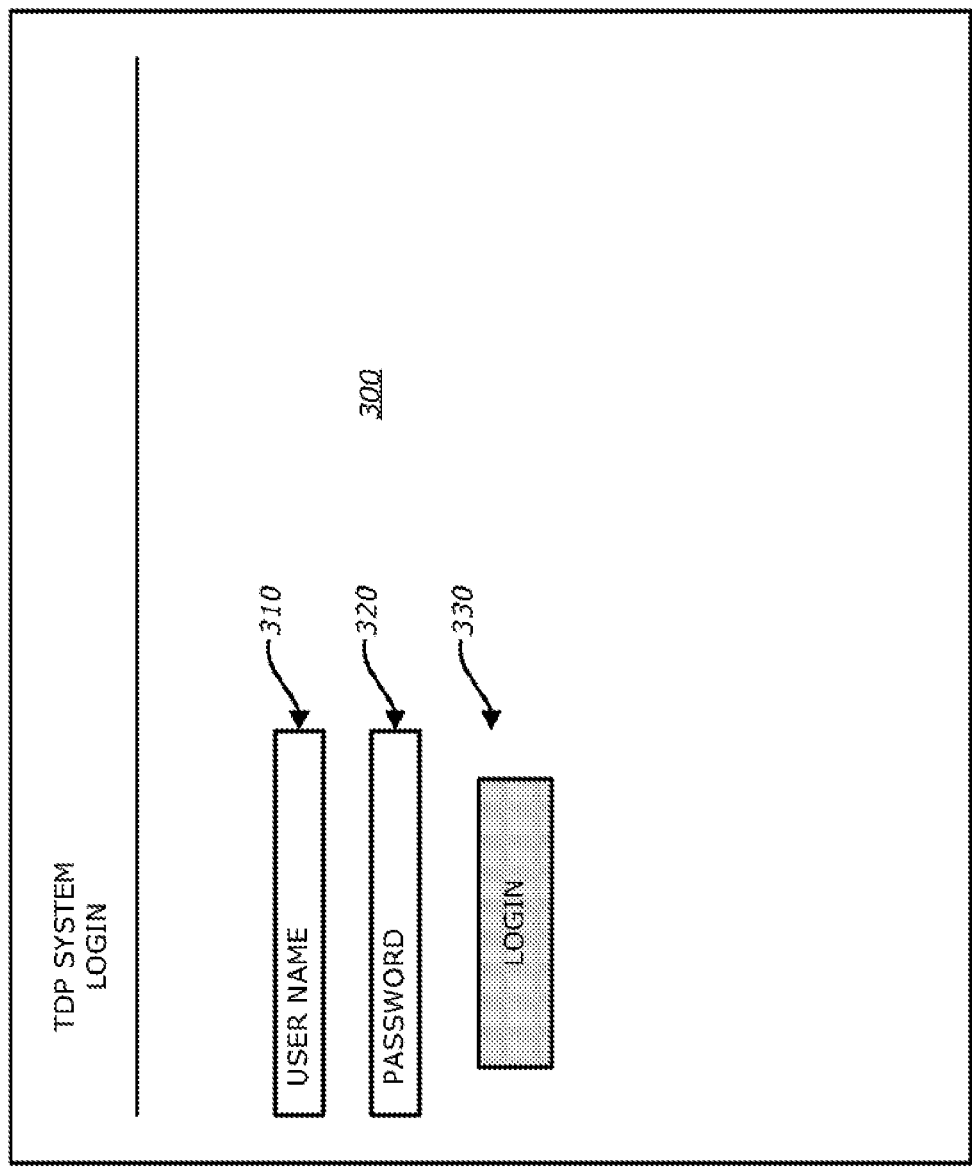
FIG. 3 is an exemplary embodiment of a first interactive display screen produced by the TDP system of FIG. 1A or 1B.

Referring to FIG. 3, an exemplary embodiment of a first interactive (Login) display screen 300 produced by TDP system 110 of FIG. 1A or 1B is shown. Herein, in order to gain access to the TDP system 110 for loading of one or more master images that are used in the generation of guest images for VM configuration, an administrator initially establishes a network connection with the TDP system. This network connection may be established in accordance Hypertext Transfer Protocol (HTTP) Request or HTTP Secure (HTTPS) communication protocols.

As shown, an initial request for access to the TDP system is redirected to provide a Login display screen 300 that features at least two entry fields; namely a User Name 310 and a Password 320. The User Name entry field 310 requires the user to enter a registered user name in order to identify the user seeking access to the TDP system. Password entry field 320 allows the user to enter his or her password.

Once a login button 330 is selected, the user name and password are provided to logic within the TDP system, such as the system control logic 240 of FIG. 2A. Once the user seeking access to the TDP system has been authenticated, access privileges for that user are set and the user is provided with a second interactive display screen 400 as shown in FIG. 4.

Figure 4:
FIG. 4 is an exemplary embodiment of a second interactive display screen for operation selection produced by the TDP system of FIG. 1A or 1B.

Referring now to FIG. 4, an exemplary embodiment of the second interactive display screen 400 for operation selection is shown. Herein, interactive display screen 400 comprises a plurality of select area 410 and 420 that, when selected, signal the TDP system as to which operations are requested. As shown, the select areas 410 and 420 comprise (1) a link 410 to commence uploads of one or more master images and (2) a link 420 to download a dashboard (area 420).

Figure 5:
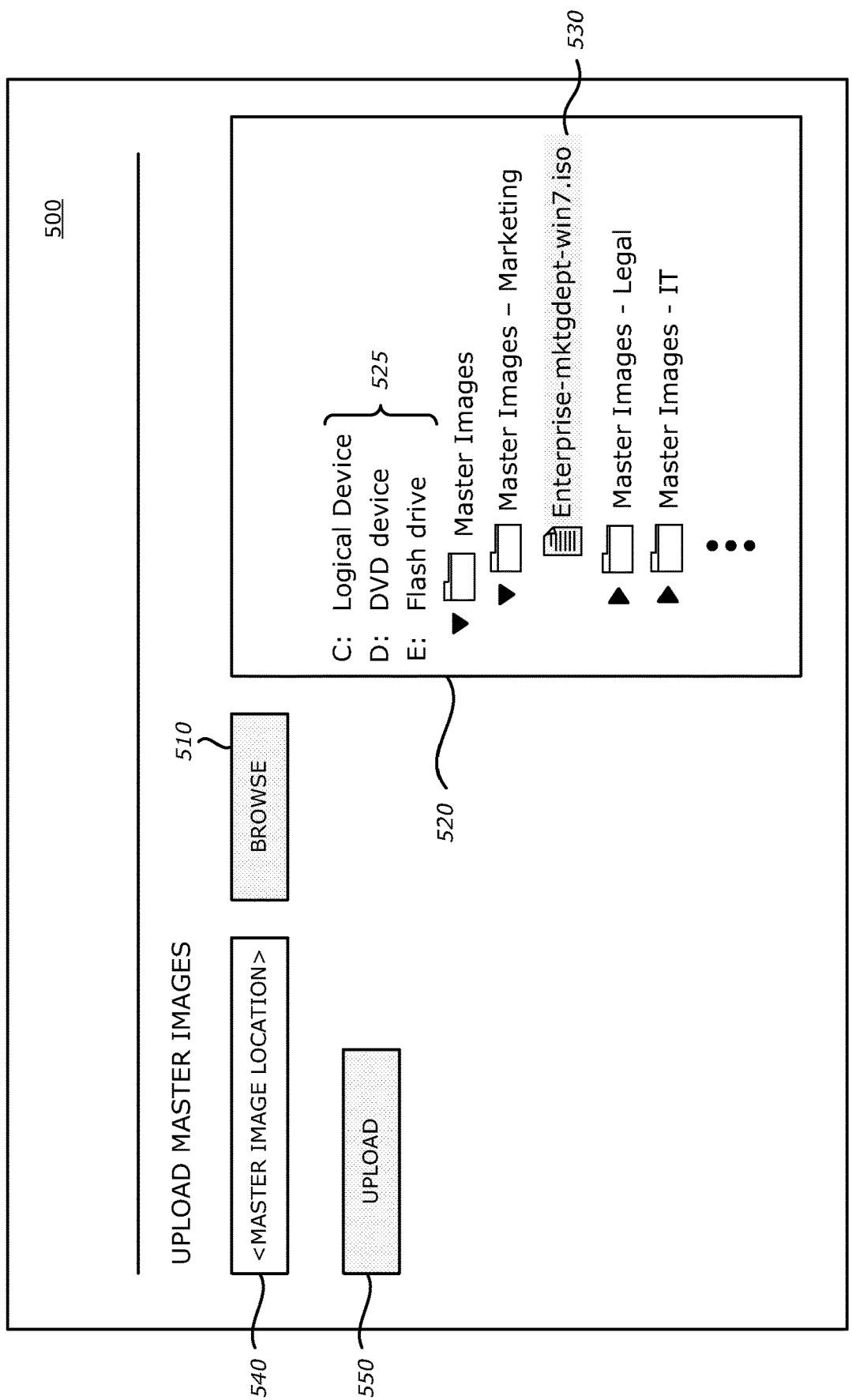
FIG. 5 is an exemplary embodiment of a third interactive display screen produced by the TDP system of FIG. 1A or 1B.

For instance, upon first area 410 being selected, the TDP system produces a third interactive display screen, namely master image upload display 500 as shown in FIG. 5. Master image upload display 500 includes a "Browse" button 510 that, when selected, causes a pull-down listing 520 to be displayed. The pull-down listing 520 comprises a plurality of storage locations 525 from which a particular master image 530 may be retrieved for uploading to the TDP system. These storage locations 525 may include local storage at the network administrator's computer (e.g., hard disk drive, optical drive, etc.), external storage at a remote file share, or the like. Hence, upon selection of the particular master image that is sequentially displayed in search area 540 and activation of the "Upload" button 550, the particular master image is uploaded to one of the memory blades $160_1$-$160_M$ (FIG. 1A) or master guest database 190 (FIG. 1B).

In lieu of uploading single master images to the TDP system, master image upload display 500 provides a capability of batch uploads. According to one embodiment of the disclosure, a folder 560 from the pull-down listing 520 may be selected where, upon being displayed in search area 540 and activation of the "Upload" button 550 occurs, all master images within the selected folder are uploaded. Alternatively, the master images may be uploaded using a command string. For instance, a File Transfer Protocol (FTP) command string (e.g., "sftp -b batchfile . . . ", where batchfile has a list of "Put" commands for master images along with their storage locations) is entered into search area 540 and upon activation of the "Upload" button 550, all master images identified in the list (batchfile) are subsequently uploaded by the TDP system.

Figure 6:
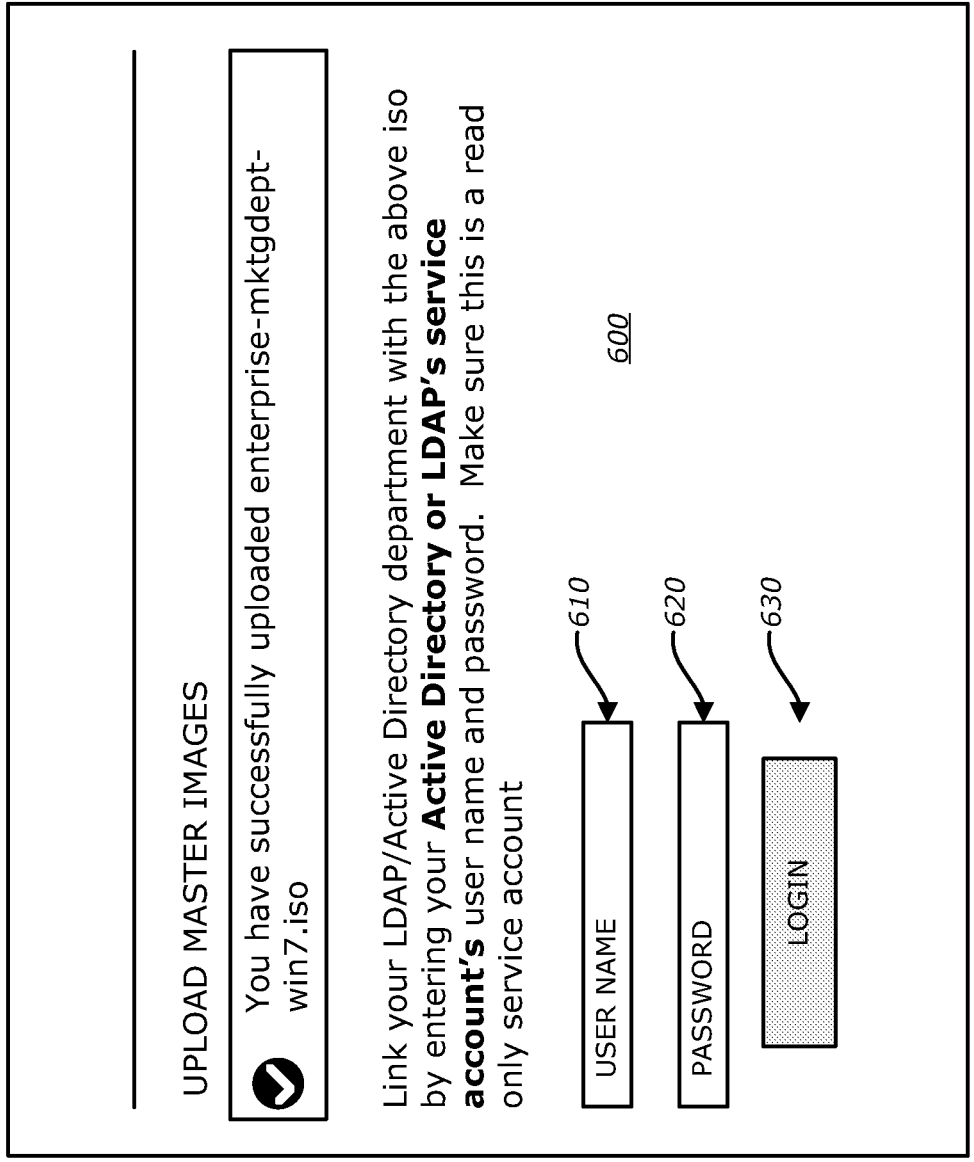
FIG. 6 is an exemplary embodiment of a fourth interactive display screen for relating an uploaded master image to one or more groups within an enterprise.

Referring now to FIG. 6, an exemplary embodiment of a fourth interactive display screen 600 produced by the TDP system 110 of FIG. 1A or 1B for relating an uploaded master image to one or more groups within an enterprise is shown. Herein, display screen 600 comprises a plurality of entry fields area 610 and 620 in order to relate content within the LDAP server for the enterprise network with the uploaded master images. A first entry field 610 requires entry of a LDAP credential such as a user name for accessing the LDAP server. A second entry field 620 requires entry of a password to gain access to content within the LDAP server, which is a database including groups and members (or client devices) being part of the corresponding group.

Figure 7:
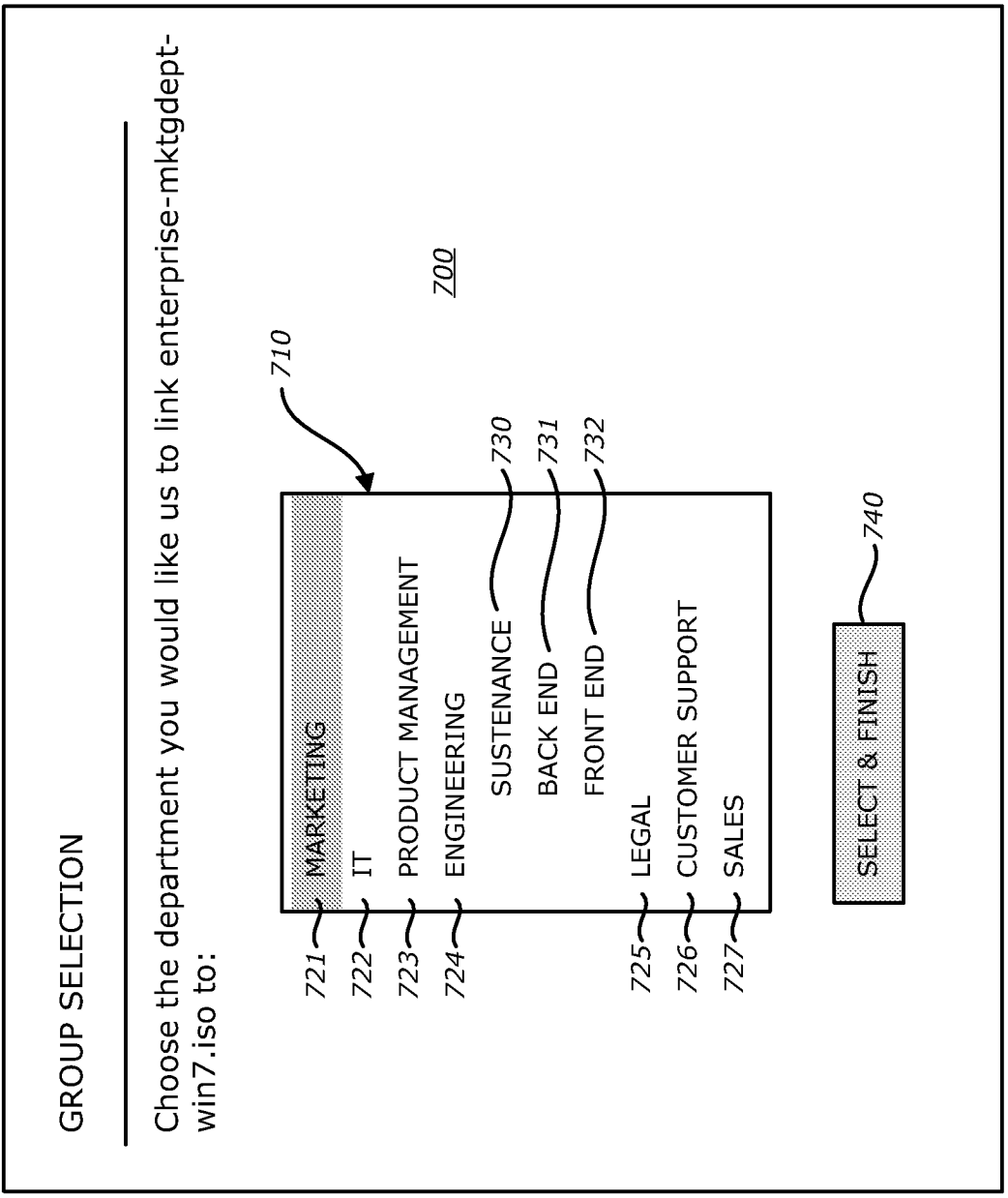
FIG. 7 is an exemplary embodiment of a fifth interactive display screen that produces a listing of the groups maintained by the LDAP server.

Once a login button 630 is selected and the entered LDAP credential has been authenticated, a fifth interactive display screen 700 is provided that produces a listing of the groups maintained by the LDAP server, as shown in FIG. 7. Herein, a listing 710 of the groups comprises different departments and sub-departments of an enterprise. For instance, the departments may include Marketing 721, IT 722, Product Management 723, Engineering 724, Legal 725, Customer Support 726 and Sales 727. The sub-departments for the Engineering department 724, such as Sustenance 730, Back-End 731 and Front-End 732, may be selected to provide greater group granularity so that client devices controlled by members in different sections within the department may be configured differently.

As an illustrative example, members of the Engineering department 724 within an enterprise may be associated with a different master image (e.g., different software and/or versions of software) than member of the Marketing department 721. Similarly, members within the Back-End section 731 of the Engineering department 724 may be associated with a different master image (e.g., different software and/or versions of software) than member of the Front-End section 732 of the Engineering department 724.

One or more of these departments and/or sub-departments may be selected, and upon selection of the "Select & Finish" button 740, the TDP system relates the particular master image to the selected department(s) and/or sub-department(s). As an illustrative embodiment, the Marketing department 721 has been selected for relating a master image thereto.

Figure 8:
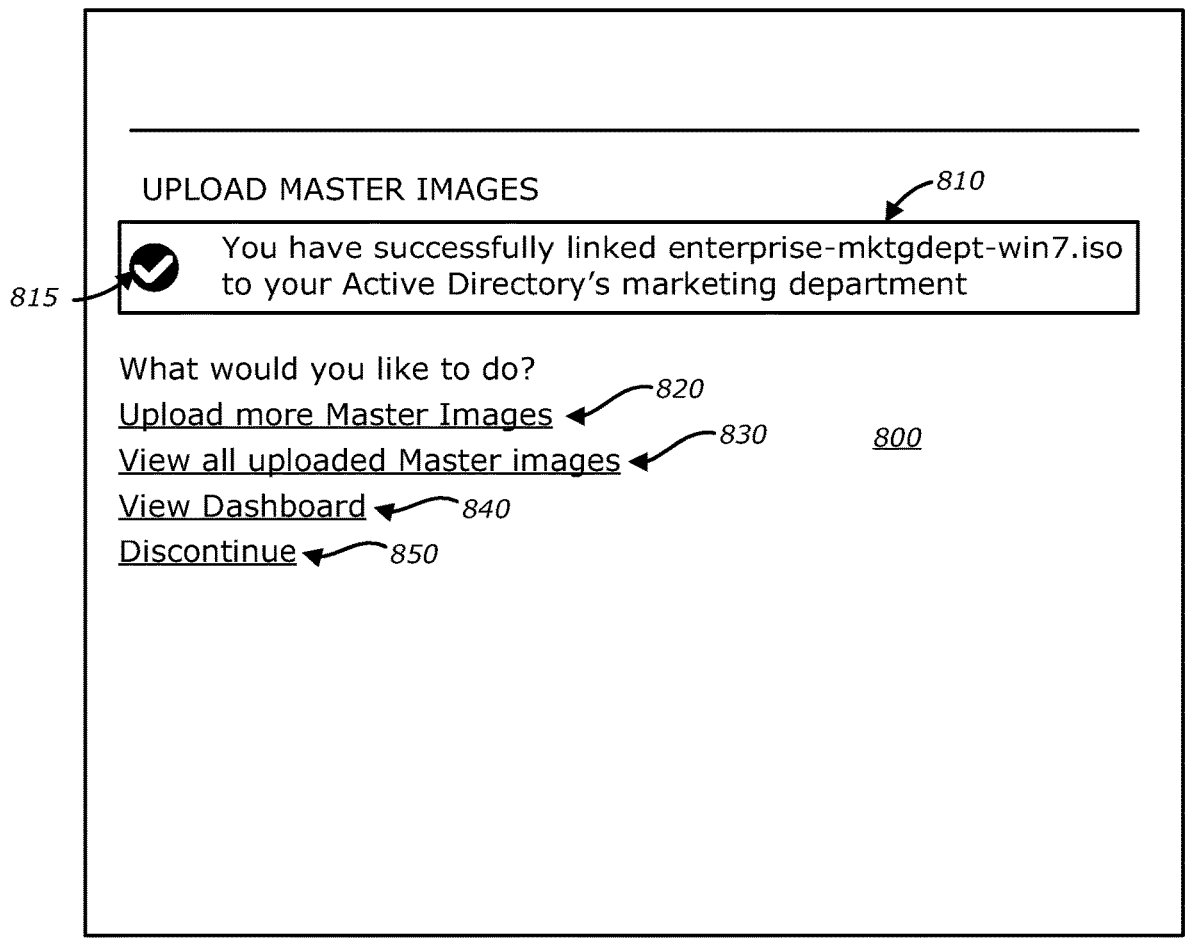
FIG. 8 is an exemplary embodiment of a fifth interactive display screen produced by the TDP system of FIG. 1A or 1B.

Referring now to FIG. 8, an exemplary embodiment of a fifth interactive display screen 800 produced by the TDP system 110 of FIG. 1A or 1B is shown. In response to successfully relating (linking) the master image (enterprise-mktgdept-win7.iso) to the LDAP's Marketing department as illustrated in FIGS. 5-7, a message 810 indicating the successful relation of the master image to a particular LDAP group is generated along with an image 815 identifying the successful relation. Thereafter, for every prescribed change in storage volume at every registered client device associated with a user of the Marketing department, the TDP system produces a new guest image associated with that client device.

According to one embodiment of the disclosure, where guest images are generated in accordance with a "push" update scheme, the client device is loaded with a native Sync program that periodically, aperiodically, or continuously monitors for changes in storage volume at the client device. In response to a difference in volume exceeding a prescribed amount, the client device issues an image update message with information associated with the differences in operating state based on the storage volume changes. According to another embodiment of the disclosure, where guest images are generated in accordance with a "pull" update scheme, the TDP system may be configured to periodically or aperiodically poll the client devices to inquire whether such devices have experienced a storage volume change that exceeds the prescribed amount since the last polling event. If so, the client device issues an image update message with information associated with the differences in operating state based on the storage volume changes. These differences are used to create a current guest image associated with the client device that is used for exploit detection as described above.

Figure 9:
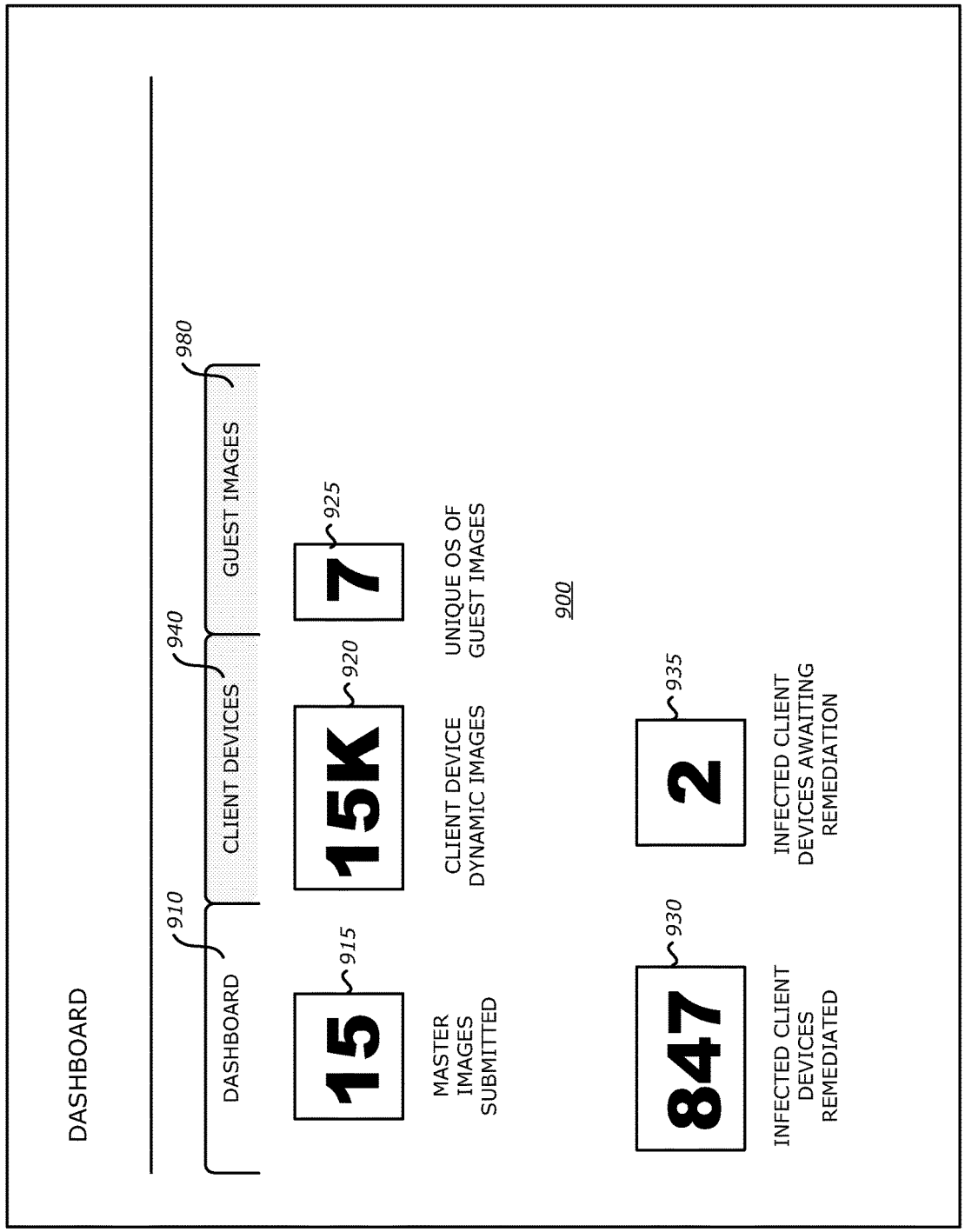
FIG. 9 is an exemplary embodiment of a sixth interactive display screen produced by the TDP system of FIG. 1A or 1B that operates as a dashboard.

Referring back to FIG. 8, the fifth interactive display screen 800 comprises a first display element 820 that, when selected, returns to the third interactive screen display 500 to continue uploading of additional master images. Screen display 800 further comprises display elements that, when selected, cause the TDP system to (i) display all uploaded master images (display element 830), (ii) view the dashboard (display element 840; FIG. 9) or (iii) disconnect communications with the TDP system (display element 850).

IV. Exemplary Dashboard Graphic User Interface

Referring to FIG. 9, an exemplary embodiment of a sixth interactive display screen 900 produced by the TDP system 110 of FIG. 1A or 1B that operates as a dashboard is shown. Herein, dashboard 900 comprises a plurality of tabs 910, 940 and 980 that are used to provide a TDP system overview, client device overview and guest image update history associated with each client device.

As shown, as a default or upon selecting of a first tab 910, the TDP system overview is provided. The TDP system overview comprises a plurality of display elements 915, 920, 925, 930 and 935 directed to image storage and client device infections. For instance, first display element 915 displays the total number of master images submitted and relied upon by the TDP system. This information enables a network administrator to visually confirm the current grouping scheme for the enterprise. The second display element 920 displays the total number of dynamic guest images for the client devices operating within the enterprise network. This information enables a network administrator to visually identify processor and/or storage constraints (e.g., encourage purchase of additional processor and/or memory blades) or reduce the number of guest images retained for each client device, as needed.

The third display element 925 identifies the number of unique OSes associated with the stored guest images. This information is useful to identify the breadth of client devices supported by the network and also the breadth of VM-analysis for exploits.

The fourth display element 930 identifies the number of infected client devices that have been remediated while the fifth display element 935 identifies the number of infected client devices that are awaiting remediation. These display elements enable the network administrator to monitor the number of client devices that have needed remediation and identify any infected client devices where remediation has not yet been accomplished so that network administrators can investigate the reasons for the delay. For instance, the user may have left for the evening prior to detection of an exploit and the infected client device still awaits permission to commence remediation. After prolonged lack of remediation, however, the network administrator may be able to conduct remediation without member (user) approval.

Figure 10:
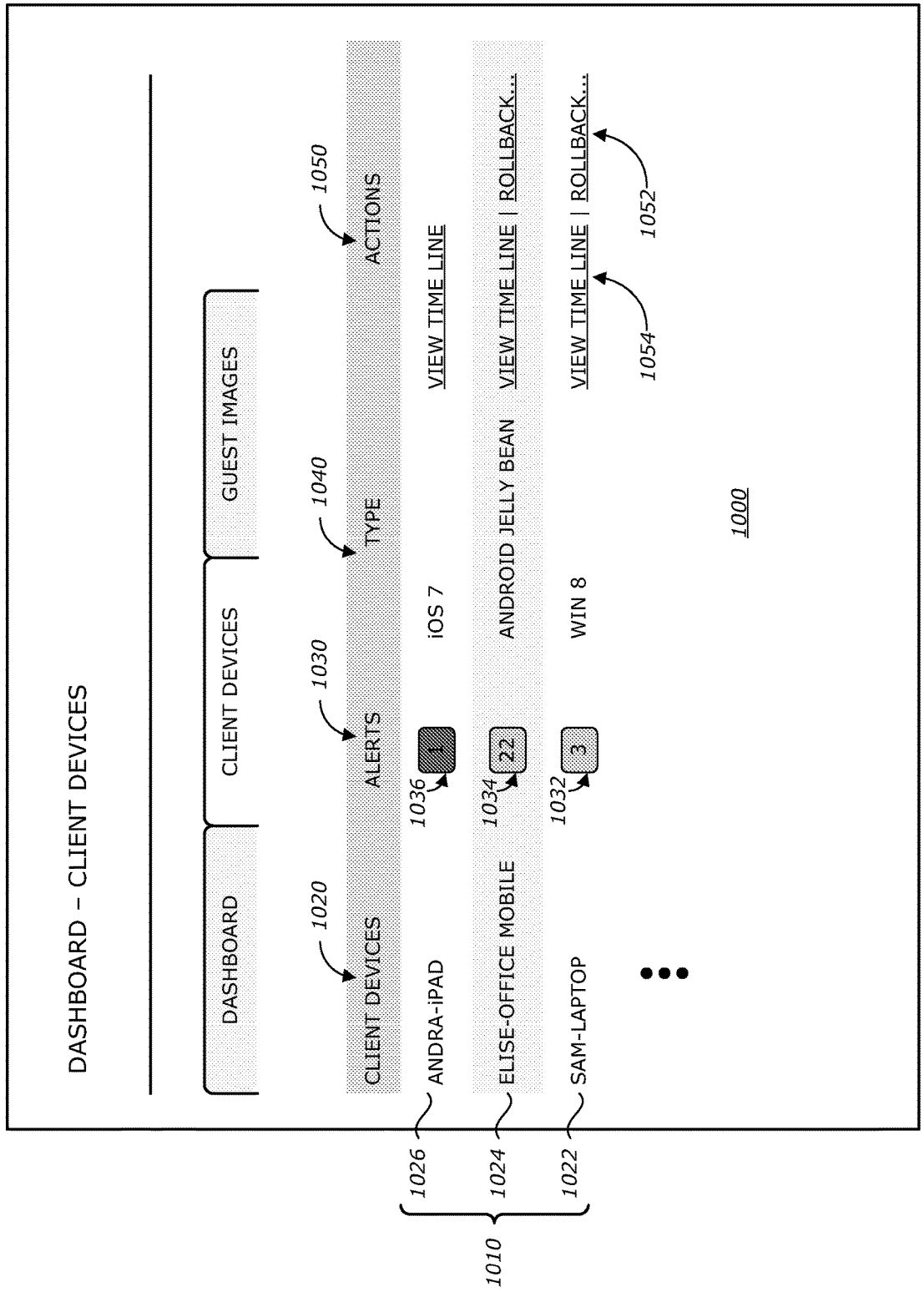
FIG. 10 is an exemplary embodiment of a seventh interactive display screen produced by the TDP system 110 of FIG. 1A or 1B in response to selection of the second tab of the dashboard.

Referring now to FIG. 10, an exemplary embodiment of a seventh interactive display screen 1000 produced by the TDP system 110 of FIG. 1A or 1B in response to selection of the second tab 940 of the dashboard 900 is shown. Herein, display screen 1000 is configured to provide an overview of the current operating state of the client devices along with selectable views of the operating state over a prescribed duration and selectable remediation.

Herein, display screen 1000 comprises a listing 1010 of client devices associated with the enterprise network, where the client devices represented in the listing 1010 may be displayed based on assigned groups, alphabetically by device name, greatest number of alerts, and/or OS type. In particular, listing 1010 includes a client name category 1020, alert category 1030, OS type 1040, and actions 1050.

The client name category 1020 lists each client device by identifier (e.g., assigned name for the client device). As shown, three client devices 1022, 1024 and 1026 are illustrated to show how client devices may be listed.

The alert category 1030 identifies the number of alerts (finding of potential exploits) within network traffic involving each client device along with a color coding to identify whether all of the alerts have been remediated. For instance, as shown, client device-1 alert 1032 identifies three (3) alerts in which exploits were verified by the dynamic analysis engine and remediation occurred based on the particular color of the alert identifier. Also, client device-2 alert 1034 identifies twenty-two (22) alerts of which all involved exploits verified by the dynamic analysis engine that have been remediated. Client device-3 alert 1036 identifies one (1) alert which has not yet been remediated based on the different color coding than alerts 1032 and 1034.

The OS type category 1040 identifies the current OS type (and version) implemented within the corresponding client device. As shown, each of these client devices 1022-1026 have a different OS, namely Windows® 8, Android® Jelly Bean™ and iO57, respectively.

Figure 11:
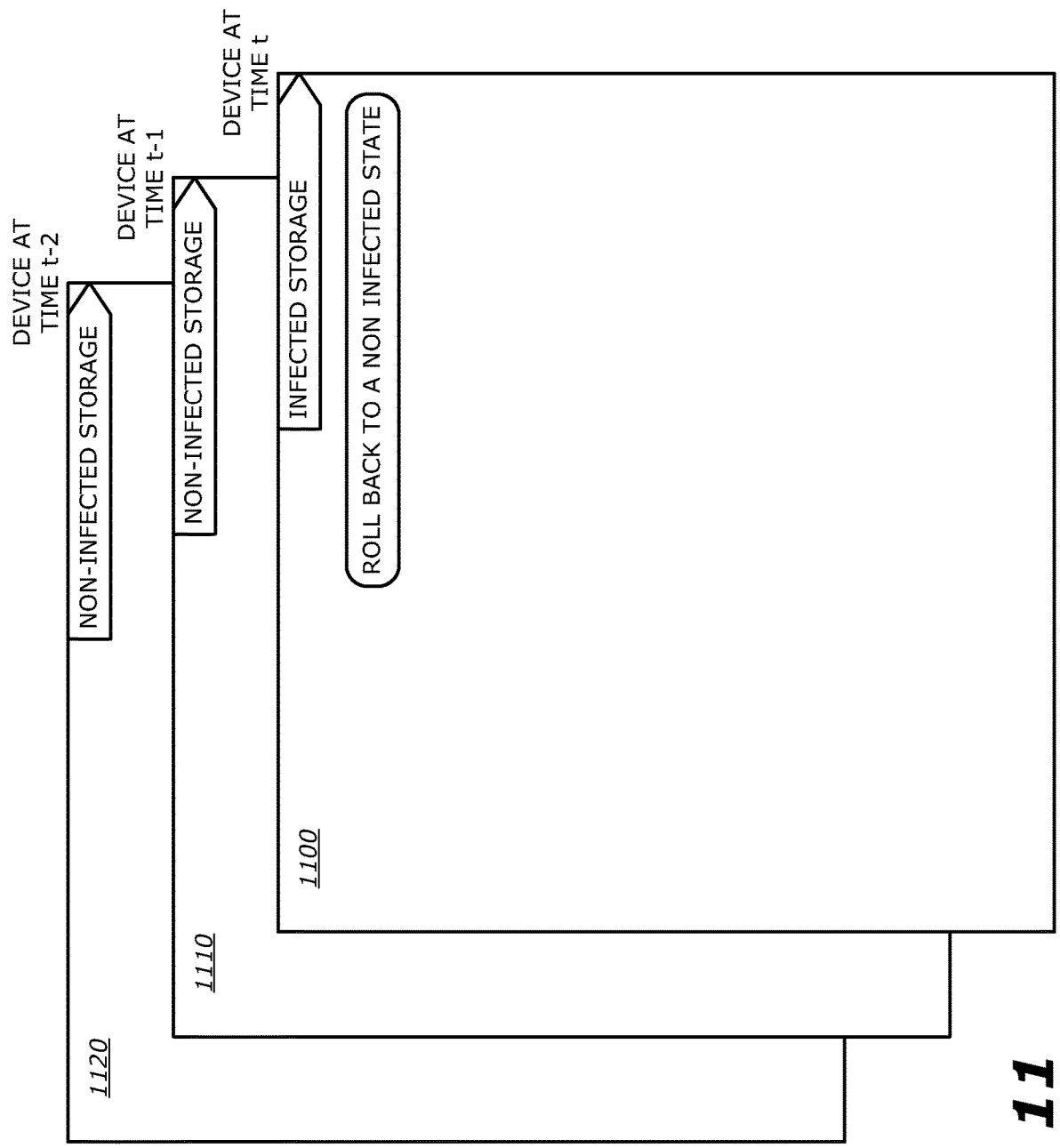
FIG. 11 is an exemplary embodiment of an interactive display screen for remediation.

Finally, the actions 1050 provide links that, when selected, enable the administrator to manually perform a number of operations. For instance, the administrator may select the remediation link 1052 that, after selection, causes images 1100, 1110 and 1120 representative of the stored guest images for the client device to be displayed as shown in FIG. 11. For instance, image 1100 identifies the content and structure of the storage volume for the client device in an infected state at time "t" while images 1110 and 1120 identify the content and structure of the storage volume of the client device in an earlier non-infected state at time "t−1" and "t−2", respectively. Remediation may be conducted for the corresponding client device by selecting most recent guest image 1110 (time t−1) in a non-infected state. Of course, in lieu of conducting remediation with the most recent guest image 1110, there may be an ability to select previous guest images (e.g., guest image 1120) for remediation.

Furthermore, the administrator may select the timeline link 1054 that provides a chronological illustration of guest image updates and detected infections.

V. Remediation Scheme

Figure 12:
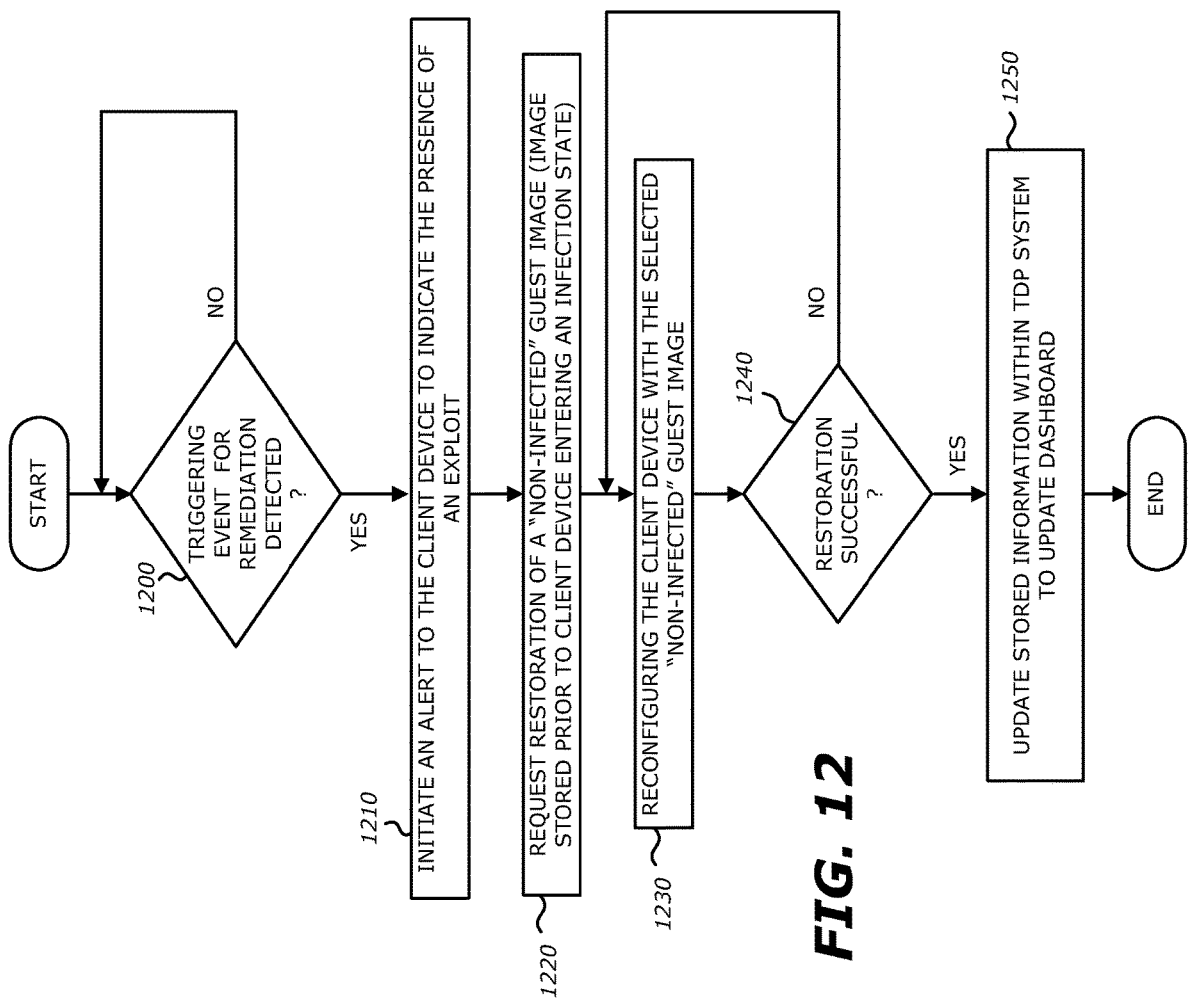
FIG. 12 is an exemplary flowchart of a remediation scheme for transitioning a client device from an infected state to an uninfected state.

Referring to FIG. 12, an exemplary flowchart of a remediation scheme for transitioning a client device from an infected state to an uninfected state is shown below. Initially, remediation may be conducted in response to detection a triggering event (block 1200). The triggering event may be periodic or aperiodic in nature. For instance, as an illustrative example, the remediation scheme may be invoked in response to detection by the TDP system of an exploit within an object of network traffic from/to a client device. Where the exploit was identified after receipt of the object by the client device and activation of the exploit, the client device has transitioned from a non-infected state to an infected state.

Upon detecting a triggering event, the TDP system may initiate an alert to the client device (block 1210). According to one embodiment, the receipt of an alert may cause the client device to request restoration of a guest image stored prior to infection of the client device and commence restoration (blocks 1220 and 1230). For instance, the alert may prompt the user to manually request remediation and commence remediation by restoring the most recent "non-infected" guest image on the client device. As an alternative, the alert may cause automatic remediation by automatically restoring the most recent "non-infected" guest image on the client device.

If remediation is successful, metadata used in the dashboard display screen and other display screens is uploaded (blocks 1240 and 1250). If remediation is unsuccessful, a retry may be conducted or a different guest image may be selected after successive failed retries.

Additionally, the alert may prompt an administrator with higher level credentials (e.g., super-user rights) to view the operations of the exploit, replay and push back non-malicious information lost by the reinstallation of the most recent "non-infected" guest image.

Furthermore, it is contemplated that statistics concerning detected malicious attacks (e.g., particular application types/versions; OS types/versions) may be used to harden the TDP system. Such hardening of the TDP system may include, but is not limited or restricted to (i) producing enterprise rules to decrease vulnerabilities (e.g., no client device may be uploaded with certain software, etc.); (ii) sharing with third parties to increase awareness of potential attacks, especially zero-day; and (iii) determine types of applications that are more vulnerable than others, which may allow an administrator to enable, disable or otherwise update specific applications within the guest image as new software is deployed and existing software is updated.

In the foregoing description, the invention is described with reference to specific exemplary embodiments thereof. For instance, it is contemplated that, in lieu of the interactive display screens described above, features of these interactive display screens may be provided through different types of display screen or even multiple display screens. The display screens are provided for illustrative purposes. It will, however, be evident that various modifications and changes may be made to the illustrative embodiments without departing from the broader spirit and scope of the invention as set forth in the appended claims.

What is claimed is:

1. A computerized method comprising:
   relating a master image to a first group of a plurality of groups, the master image representing a base amount of content to be loaded into a client device for use by a member of at least the first group of the plurality of groups;
   automatically generating a software guest image for a targeted client device assigned to or associated with the first group of the plurality of groups in response to a change of storage volume in the targeted client device, the software guest image being based, at least in part, on (i) a prior software guest image of an operating state of the targeted client device that is prior to the change of storage volume and (ii) changes in the operating state of the targeted client device that have occurred after generation of the prior software guest image;
   dynamically configuring a virtual machine with the software guest image representing a current operating state of the targeted client device, the software guest image representing content and structure of the storage volume for the targeted client device at a time of configuring the virtual machine; and
   processing an object by the virtual machine in order to detect any anomalous behaviors that would cause the object to be classified as an exploit, the object being data associated with network traffic directed to the targeted client device.

2. The computerized method of claim 1, wherein the object is a plurality of related packets.

3. The computerized method of claim 1, wherein the prior software guest image includes either (i) the master image of the first group or (ii) a guest image based on the master image of the first group.

4. The computerized method of claim 1, wherein the generating of the software guest image for the targeted client device that is used in configuring the virtual machine prior to processing the object occurs in response to a first polling event, the first polling event is based on the change of the storage volume in the targeted client device exceeding a prescribed amount since a prior polling event.

5. The computerized method of claim 1, wherein the generating of the software guest image is further based on the prior software guest image representing a prior operating state of the targeted client device preceding the change of the storage volume.

6. The computerized method of claim 5, wherein the prior software guest image is based on the master image of the first group that includes software and corresponding metadata that is originally loaded into the targeted client device.

7. The computerized method of claim 5, wherein the prior software guest image is based on the guest image that represents software and corresponding metadata stored within the targeted client device at a time preceding the change of the storage volume.

8. The computerized method of claim 1, wherein the targeted client device transitions from a non-infected state to an infected state upon receipt and processing of the object having the exploit.

9. The computerized method of claim 8 further comprising:
   conducting a remediation to restore an operating state of the targeted client device from the infected state to the non-infected state, the remediation includes loading a stored, software guest image associated with the targeted client device prior to targeted client device transitioning from the non-infected state to the infected state.

10. The computerized method of claim 9, wherein the remediation occurs automatically without being prompted by the user.

11. The computerized method of claim 8, wherein responsive to transitioning the targeted client device from the non-infected state to the infected state upon receipt and processing of the object having the exploit, the method further comprising:
determining a software guest image prior to the targeted client device receiving the object including the exploit; and
restoring an operating state of the targeted client device by restoring the software guest image on the targeted client device so that the client device reverts to an operating state of the client device prior to activation of the exploit.

12. The computerized method of claim 1, wherein the master image provides an initial operating state corresponding to initial amount of software installed on the targeted client device for use by the member.

13. A system operating as a security cloud service, comprising:
one or more memory blades; and
one or more processor blades communicatively coupled to the one or more memory blades, the one or more processor blades include a first processor blade that includes logic to
automatically generate a software guest image for a targeted client device in response to a change of storage volume in the targeted client device, wherein the targeted client device is associated with a first group of a plurality of groups and each group is assigned a master image representing a base amount of content to be loaded into client devices associated with a particular group of the plurality of groups, the software guest image being based, at least in part, on a prior software guest image of an operating state of the targeted client device that is prior to the change of storage volume and changes in the operating state of the targeted client device that have occurred after generation of the prior software guest image, the prior software guest image includes either (i) a master image associated with the first group or (ii) a guest image based on the master image,
determine that an incoming object, including data associated with network traffic directed to the targeted client device, is suspicious by having characteristics that suggest the object is an exploit,
dynamically configure a virtual machine with the software guest image representing a current operating state of the targeted client device to which the object is directed, the software guest image representing content and structure of the storage volume for the targeted client device at a time of configuring the virtual machine, and
process the object by the virtual machine in order to detect any anomalous behaviors that would cause the object to be classified as an exploit.

14. The system of claim 13, wherein the object is associated with network traffic directed to the targeted client device.

15. The system of claim 13, wherein prior to logic within the first processor blade dynamically configuring the virtual machine with the software guest image, a memory blade within the one or more memory blades including logic to generate the software guest image for the targeted client device based on the change of storage volume in the targeted client device.

16. The system of claim 15, wherein the memory to generate the software guest image based on the prior software guest image representing a prior operating state of the targeted client device being the operating state of the targeted client device prior to the change of storage volume.

17. The system of claim 13, wherein the one or more memory blades includes a plurality of memory blades including at least a first memory blade to store master images and a second memory blade to store guest images for each of the plurality of groups.

18. The system of claim 13, wherein the particular group is determined from information within a Lightweight Directory Access Protocol (LDAP) server.

19. The system of claim 13, wherein the anomalous behaviors include unexpected behaviors.

20. The system of claim 19, wherein the unexpected behaviors include communication-based anomalies or execution-based anomalies.

21. The system of claim 13, wherein the one or more memory blades constitute logic that is individually or collectively responsible for controlling a configuration of the system, including (1) uploading or storing master images, (2) generating or storing guest images, or (3) generating a dashboard or other display screen for configuration and control of the system.

22. The system of claim 13, wherein the one or more processor blades constitute logic that is responsible for performing static or dynamic exploit analysis on the incoming object extracted from the network traffic.

23. A system comprising:
one or more memory blades; and
one or more processor blades communicatively coupled to the one or more memory blades, the one or more processor blades includes a first processor blade that includes logic to
determine a software image prior to a client device receiving an object including an exploit, the software image being a master image representing a base amount of content to be loaded into a targeted client device,
generate a software guest image for the targeted client device in response to a change of storage volume in the targeted client device, the software guest image being based, at least in part, on the software image, and
restore an operating state of the targeted client device by restoring the software image on the client device so that the targeted client device reverts to an operating state of the targeted client device prior to activation of the exploit.

24. The system of claim 23, wherein the first processor blade comprises logic that is configured to restore the operating state of the targeted client device by at least
determining that the object, including data associated with network traffic directed to the targeted client device, is suspicious by having characteristics that suggest the object is an exploit,
dynamically configuring a virtual machine with the software guest image representing a current operating state of the targeted client device to which the object is directed, the software guest image representing content and structure of the storage volume for the targeted client device at a time of configuring the virtual machine, and processing the object by the virtual machine in order to detect any anomalous behaviors that may cause the object to be classified as an exploit.

25. The system of claim 24, wherein the object is an object associated with the network traffic directed to the targeted client device.

26. The system of claim 24, wherein the anomalous behaviors include unexpected behaviors.

27. The system of claim 26, wherein the unexpected behaviors include communication-based anomalies or execution-based anomalies.

28. The system of claim 23 operating as a cloud service communicatively coupled to an appliance to receive the object.

29. The system of claim 23, wherein the one or more memory blades constitute logic that is individually or collectively responsible for controlling a configuration of the system, including (1) uploading or storing master images, (2) generating or storing guest images, or (3) generating a dashboard or other display screen for configuration and control of the system.

30. The system of claim 23, wherein the one or more processor blades constitute logic that is responsible for performing static or dynamic exploit analysis on the received object.

31. A threat detection and prevention (TDP) system operating as a security cloud service analyzing objects associated with monitored network traffic using one or more virtual machines each dynamically configured with a guest image representing an operating state of a targeted client device, comprising:

a processor; and a non-transitory storage medium including logic that, when executed, determines a software image prior to a client device receiving an object including an exploit, the software image being a master image representing a base amount of content to be loaded into the targeted client device, generates a software guest image for the targeted client device in response to a change of storage volume in the targeted client device, the software guest image being based, at least in part, on the software image, and restores an operating state of the targeted client device by restoring the software image on the targeted client device so that the targeted client device reverts to an operating state of the targeted client device prior to activation of the exploit detected by the TDP system.

32. The TDP system of claim 31, wherein the restoring of the operating state of the targeted client device comprises determining that the object, including data associated with network traffic directed to the targeted client device, is suspicious by having characteristics that suggest the object is an exploit, dynamically configuring a virtual machine with the software guest image representing a current operating state of the targeted client device to which the object is directed, the software guest image representing content and structure of the storage volume for the targeted client device at a time of configuring the virtual machine, and processing the object by the virtual machine in order to detect any anomalous behaviors that may cause the object to be classified as an exploit.

33. The TDP system of claim 32, wherein the object is an object associated with the network traffic directed to the targeted client device.

34. The TDP system of claim 32, wherein the anomalous behaviors include unexpected behaviors.

35. The TDP system of claim 34, wherein the unexpected behaviors include communication-based anomalies or execution-based anomalies.

* * * * *